(12) United States Patent
Hashimura

(10) Patent No.: US 6,304,361 B1
(45) Date of Patent: Oct. 16, 2001

(54) SCANNING OPTICAL SYSTEM

(75) Inventor: Junji Hashimura, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/608,554

(22) Filed: Jun. 30, 2000

(30) Foreign Application Priority Data

Jul. 2, 1999 (JP) .................................................. 11-188818

(51) Int. Cl.[7] .................................................. G02B 26/08
(52) U.S. Cl. ............................ 359/205; 359/207; 359/212
(58) Field of Search .................................... 359/205–207, 359/212–219, 223, 226, 708, 718, 662; 250/234–236; 347/256–261, 241–244

(56) References Cited

U.S. PATENT DOCUMENTS 6,128,120 * 10/2000 Mushiake et al. .................... 359/221

FOREIGN PATENT DOCUMENTS

| 9-236741 A | 9/1997 | (JP) . |
| 9-236747 A | 9/1997 | (JP) . |
| 9-236766 A | 9/1997 | (JP) . |
| 9-236767 A | 9/1997 | (JP) . |

* cited by examiner

Primary Examiner—James Phan
(74) Attorney, Agent, or Firm—Sidley Austin Brown & Wood

(57) ABSTRACT

A scanning optical system has, from the object side, an object-side lens unit, a mirror, and an image-side lens unit, and scans a object by rotating the mirror while forming an image of the object on a one-dimensional line sensor. Either the object-side lens unit or the image-side lens unit includes at least one aspherical surface that fulfills a defined condition in a range that fulfills a defined condition.

7 Claims, 15 Drawing Sheets

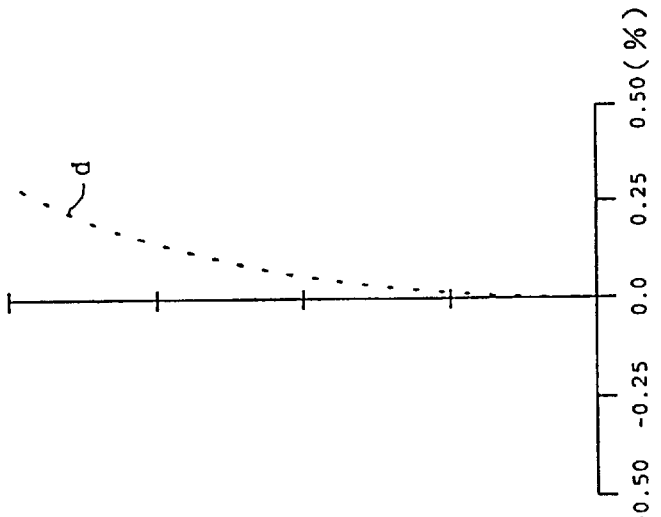
FIG.12C DISTORTION
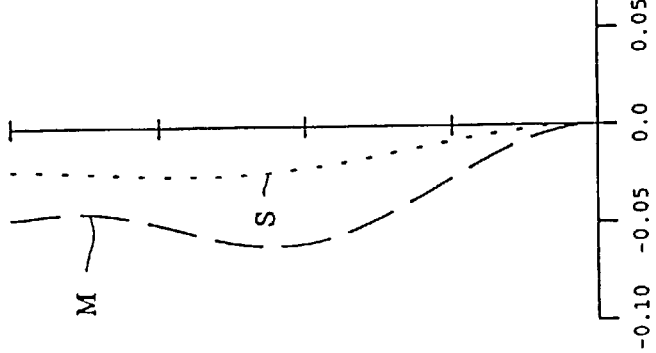
FIG.12B ASTIGMATISM
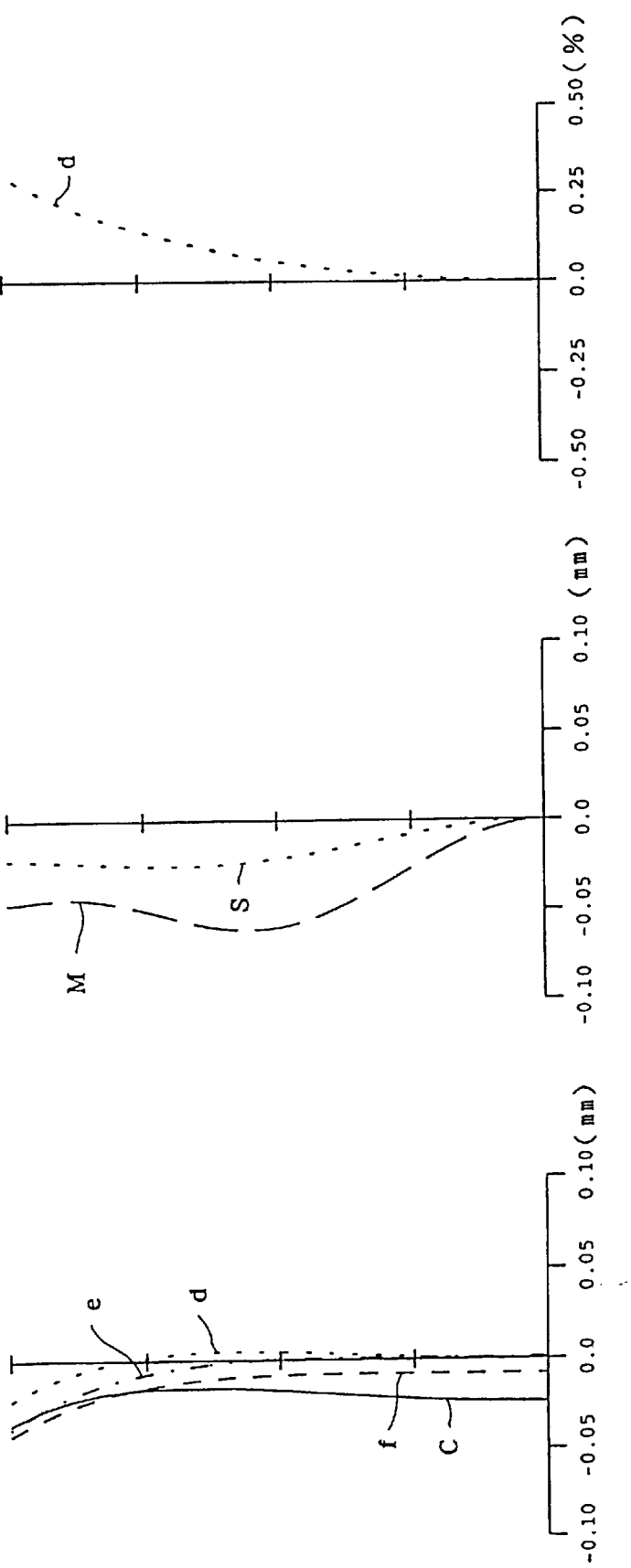
FIG.12A SPHERICAL ABERRATION

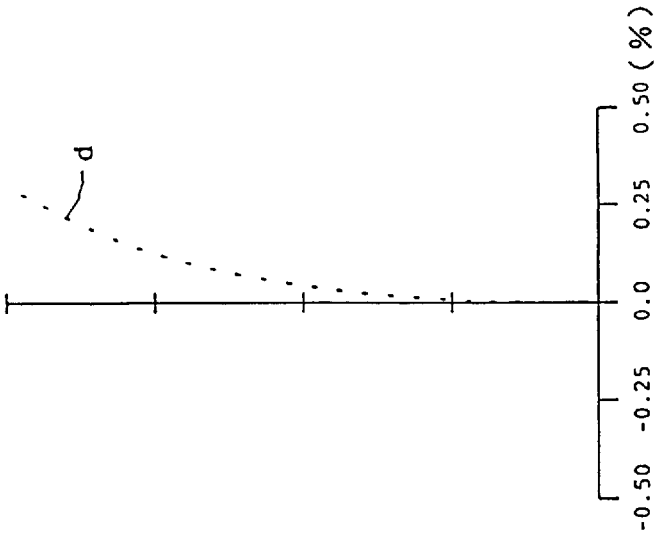
FIG.15C DISTORTION
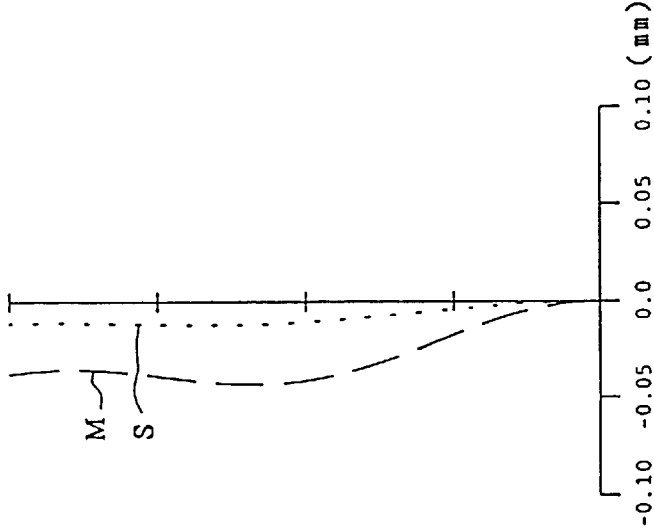
FIG.15B ASTIGMATISM
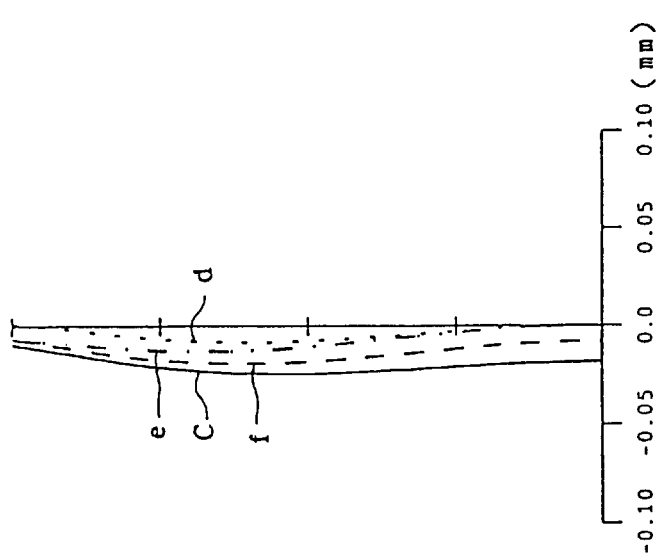
FIG.15A SPHERICAL ABERRATION

SCANNING OPTICAL SYSTEM

This application is based on application No. H11-188818 filed in Japan on Jul. 2, 1999, the entire content of which is hereby incorporated by reference.

BACKGROUND OF THE INVENTION

1. Field of the Invention

The present invention relates to a scanning optical system, and particularly to a scanning optical system of a mirror scanning type as used, for example, in a film scanner for high-speed image reading.

2. Description of the Prior Art

Of various types of scanning optical system conventionally proposed, those adopting mirror scanning are the most effective types in high-speed and high-resolution image reading (refer to Japanese Patent Applications Laid-Open Nos. H9-236741, H9-236747, H9-236766, and H9-236767). A typical mirror-scanning-type scanning optical system is composed of an image-forming optical system for forming an image of a object on a one-dimensional line sensor (for example, an image-sensing device such as a line CCD (charge-coupled device)) having light-sensing elements arranged in a line and a mirror that is rotated to swing in such a way as to scan the object in the sub scanning direction. The image-forming optical system is composed of an object-side lens unit and an image-side lens unit. The light from the object is directed through the object-side lens unit to the mirror so as to be deflected thereby, and is then focused through the image-side lens unit on the one-dimensional line sensor so as to form an image thereon. In the present specification, the direction in which the light-sensing elements of the one-dimensional line sensor are arranged is defined as the "main scanning direction", and the direction in which the object is scanned by the rotation of the mirror is defined as the "sub scanning direction".

A mirror-scanning-type scanning optical system has the disadvantage that, as its mirror is rotated to scan the object, various aberrations, such as chromatic aberration and coma, appear according to the angle at which the mirror is swung. Increasing the number of constituent lens elements to correct those aberrations leads to an undue increase in the costs of the scanning optical system.

On the other hand, reading of color images is often realized by the use of color-separation prisms. However, to minimize the costs of a scanning optical system, it is effective to eliminate the use of color-separation prisms, which are expensive. For example, using a trilinear image-sensing device makes it possible to read color images at high speed and with high resolution without color-separation prisms. However, a trilinear image-sensing device has three one-dimensional line sensors fixed parallel to one another in the sub scanning direction, and therefore its use necessitates, in addition to correction of lateral chromatic aberration, correction of longitudinal chromatic aberration, which does not pose any serious problem in a scanning optical system employing color-separation prisms. This makes it necessary to further enhance the optical performance of the scanning optical system, and thus to increase the number of constituent lens elements of the scanning optical system.

SUMMARY OF THE INVENTION

An object of the present invention is to provide a scanning optical system of a mirror scanning type that offers high optical performance with a minimum of constituent lens elements.

To achieve the above object, according to one aspect of the present invention, in a scanning optical system that is provided with, from the object side, an object-side lens unit, a mirror, and an image-side lens unit and that scans a object by rotating the mirror while forming an image of the object on a one-dimensional line sensor, the object-side lens unit includes at least one aspherical surface that fulfills the condition (1B) below in a range that fulfills the condition (1A) below:

$$0 < H < Hmax \quad (1A)$$

$$-20.0 < (\phi a - \phi 0 a)/\phi AL < 20.0 \quad (1B)$$

where

H represents the height in the direction of a radius of the lens element that has the aspherical surface, Hmax represents the effective radius of the lens element that has the aspherical surface, $\phi a$ represents the local power of the aspherical surface, $\phi 0a$ represents the power of the aspherical surface due to the reference curvature thereof, and $\phi AL$ represents the power of the lens element that has the aspherical surface, where $\phi a$ and $\phi 0a$ are defined by the formulae (1C) and (1D) below:

$$\phi a = Calo(N'-N) \quad (1C)$$

$$\phi 0a = C0(N'-N) \quad (1D)$$

where

Calo represents the local curvature of the aspherical surface at a height H,

C0 represents the reference curvature of the aspherical surface,

N' represents the refractive index of the medium existing on the image side of the aspherical surface, and N represents the refractive index of the medium existing on the object side of the aspherical surface.

According to another aspect of the present invention, in a scanning optical system that is provided with, from the object side, an object-side lens unit, a mirror, and an image-side lens unit and that scans a object by rotating the mirror while forming an image of the object on a one-dimensional line sensor, the image-side lens unit includes at least one aspherical surface that fulfills the condition (1B) noted above in a range that fulfills the condition (1A) noted above.

BRIEF DESCRIPTION OF THE DRAWINGS

This and other objects and features of the present invention will become clear from the following description, taken in conjunction with the preferred embodiments with reference to the accompanying drawings in which:

FIGS. 12A to 12C are diagrams showing the aberrations observed in Example 4;

FIGS. 15A to 15C are diagrams showing the aberrations observed in Example 5.

DESCRIPTION OF THE PREFERRED EMBODIMENTS

Figure 1:
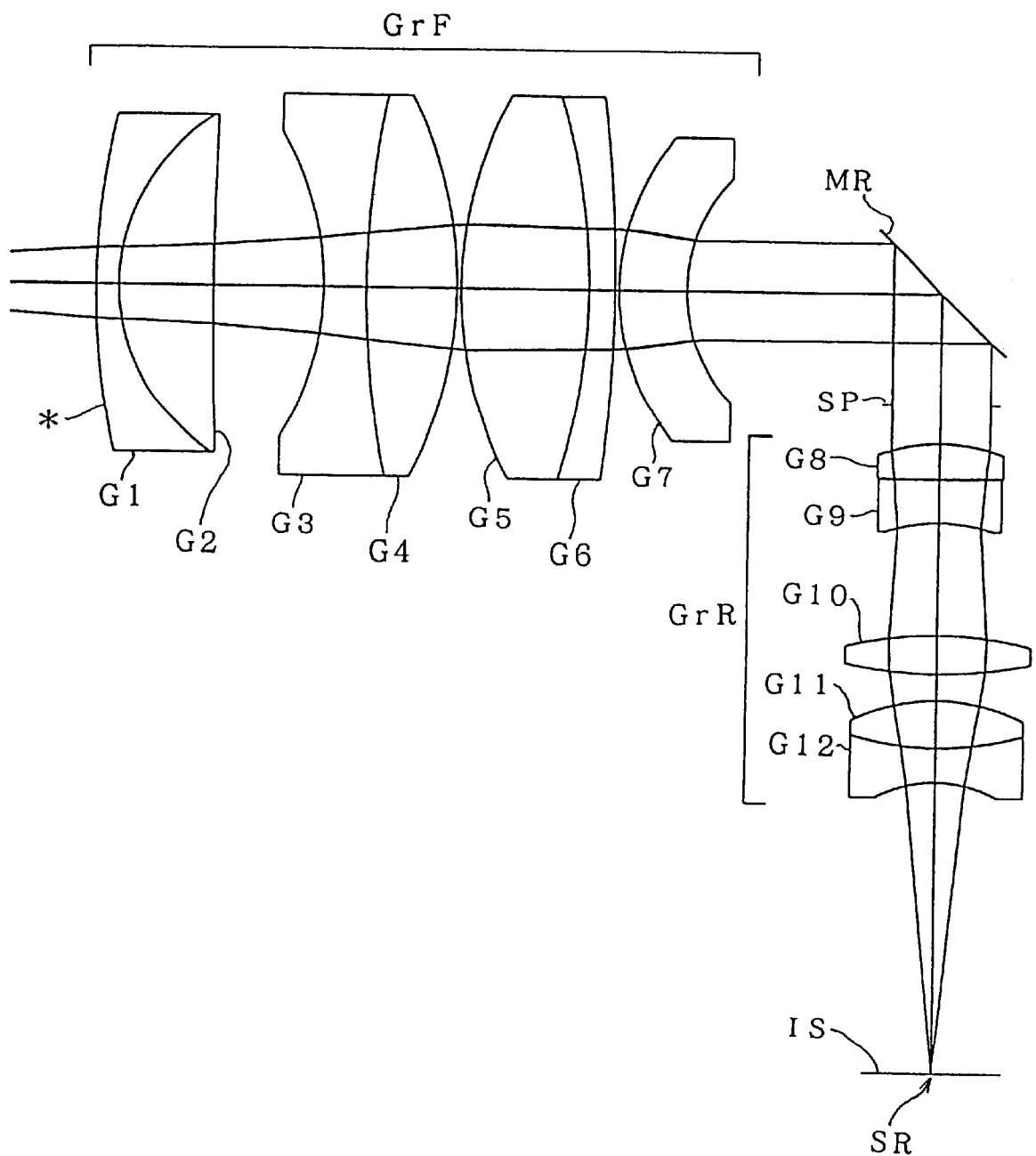
FIG. 1 is a diagram showing the optical construction of a first embodiment (Example 1)
Figure 2:
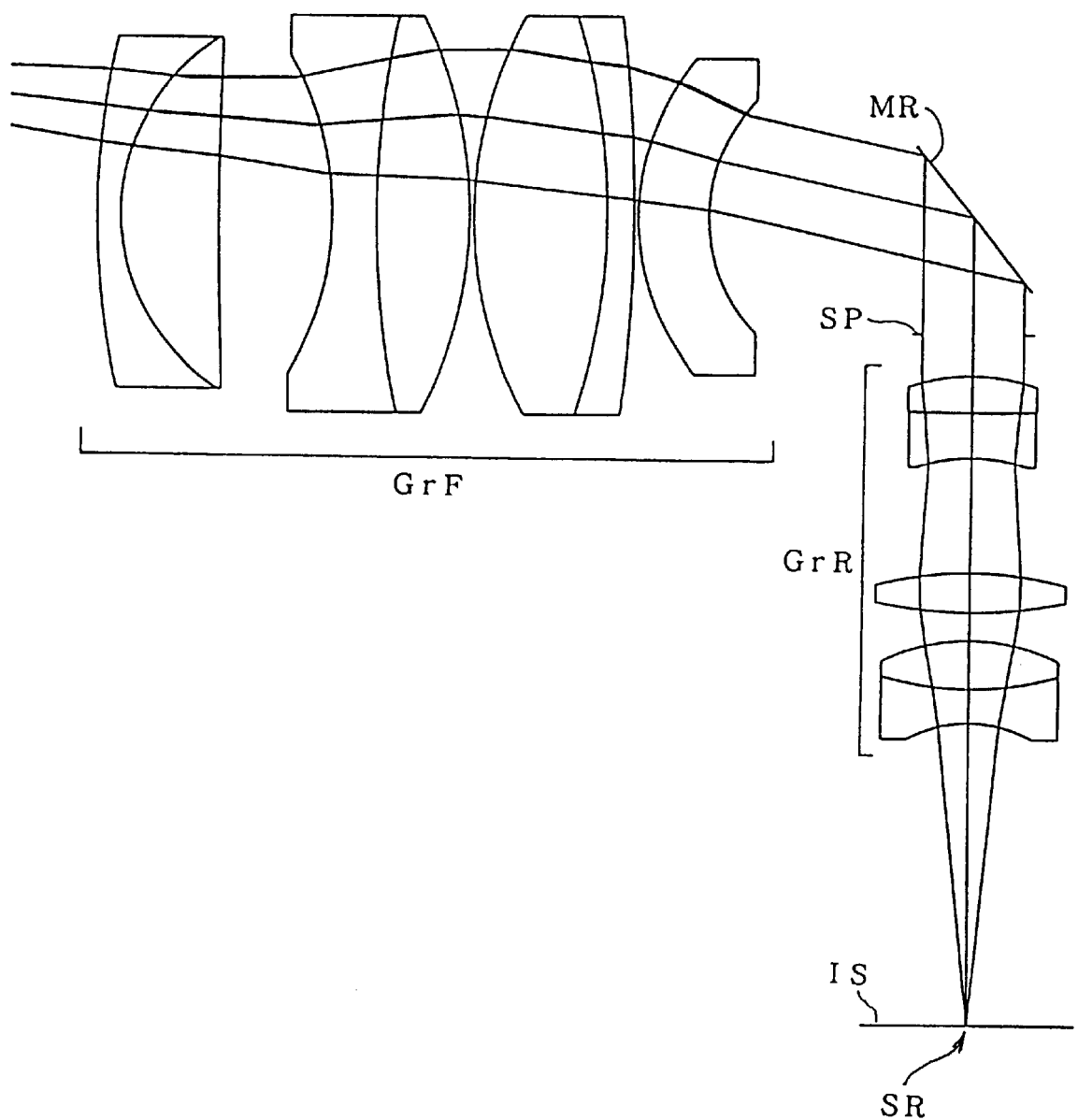
FIG. 2 is a diagram showing the optical construction of the first embodiment (Example 1), with the mirror swung to the maximum.
Figure 4:
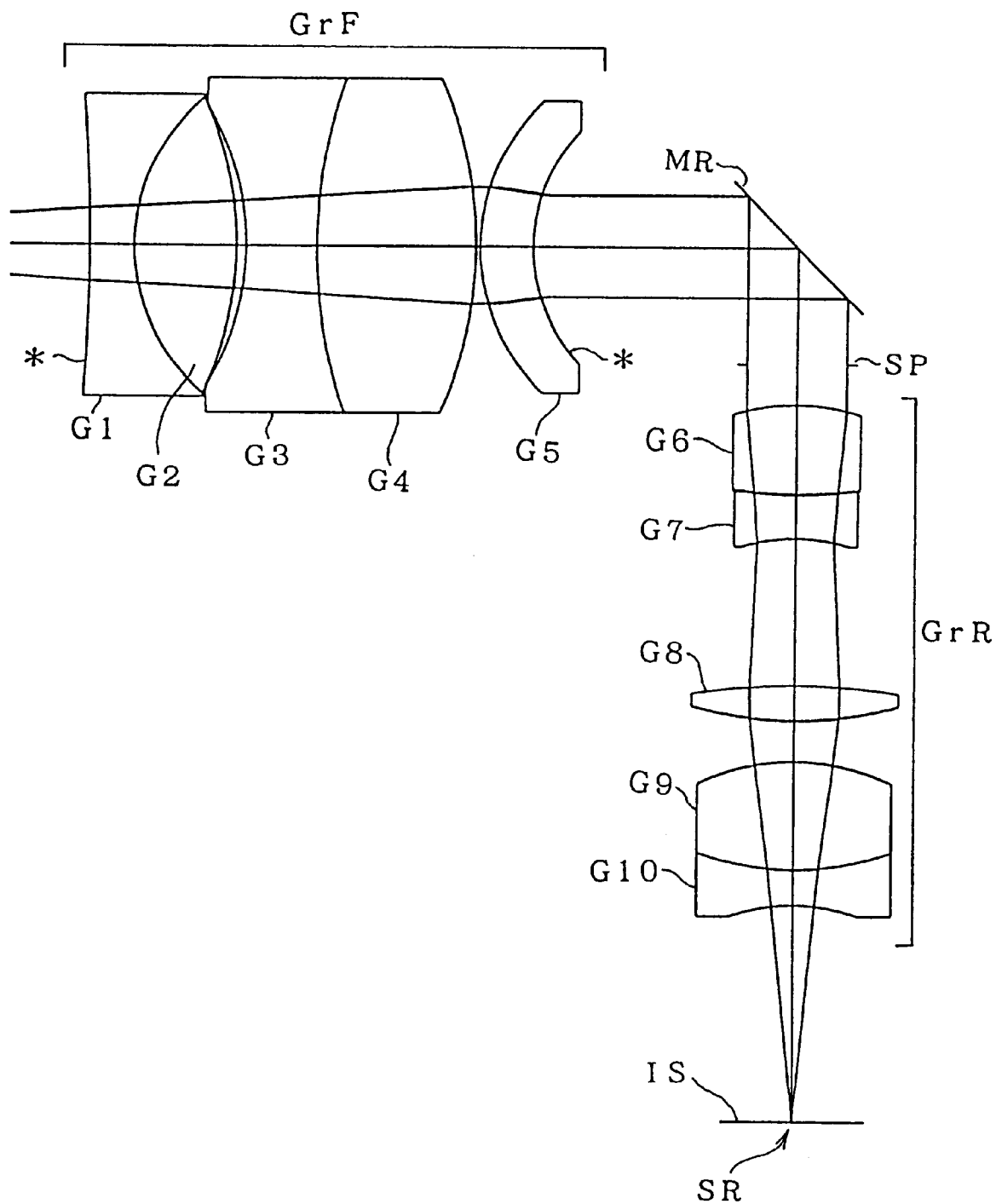
FIG. 4 is a diagram showing the optical construction of a second embodiment (Example 2)
Figure 5:
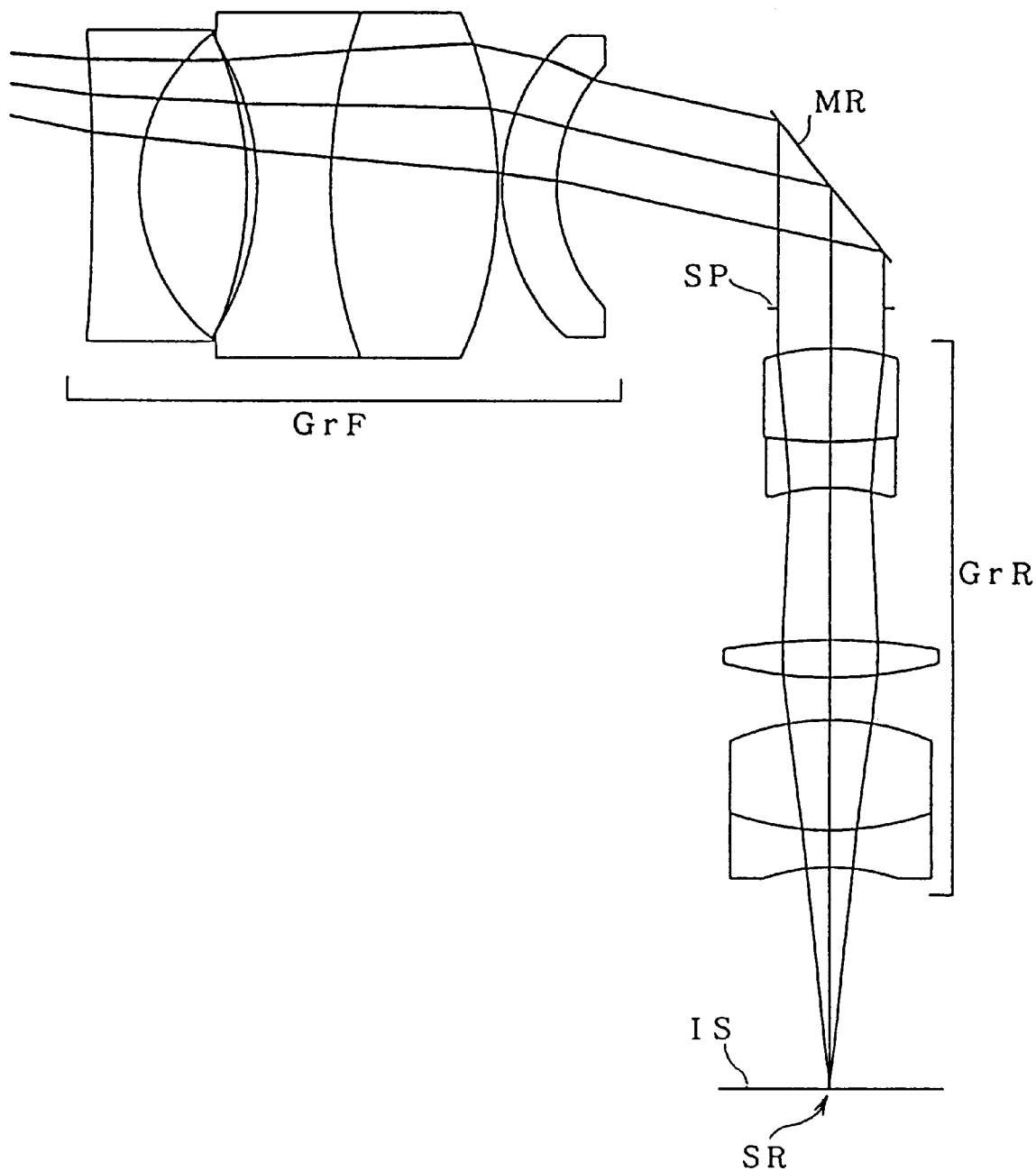
FIG. 5 is a diagram showing the optical construction of the second embodiment (Example 2), with the mirror swung to the maximum.
Figure 7:
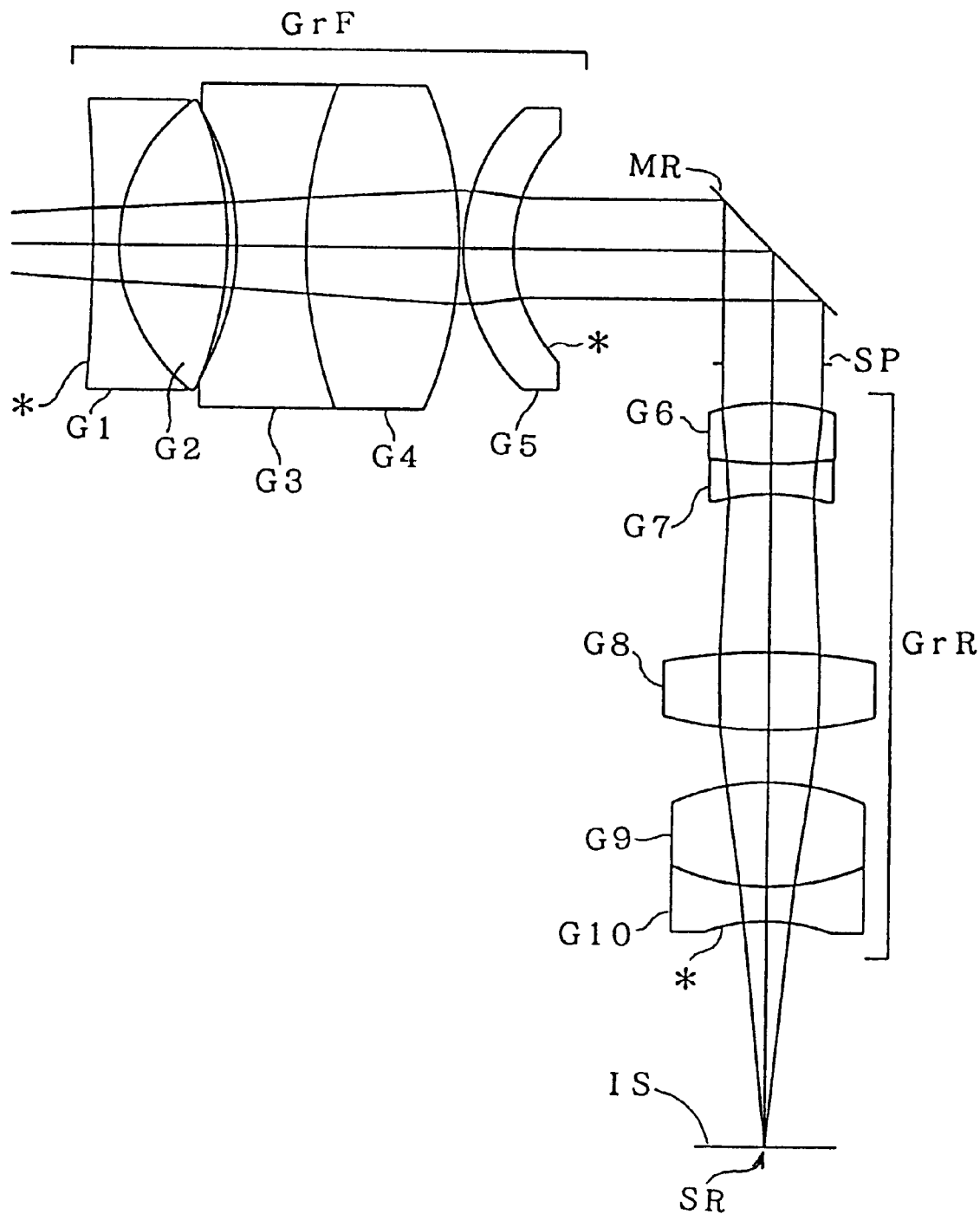
FIG. 7 is a diagram showing the optical construction of a third embodiment (Example 3)
Figure 8:
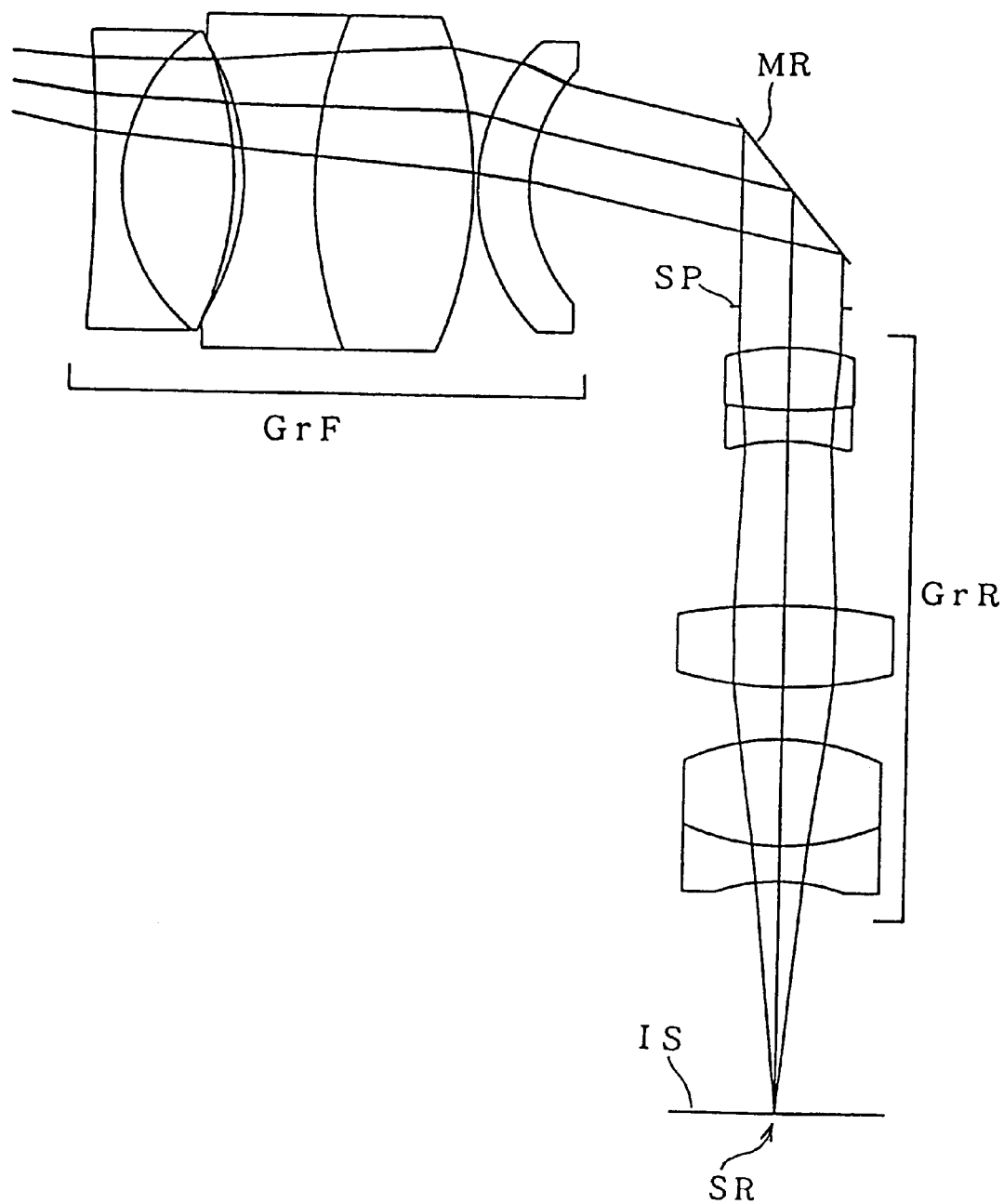
FIG. 8 is a diagram showing the optical construction of the third embodiment (Example 3), with the mirror swung to the maximum.
Figure 10:
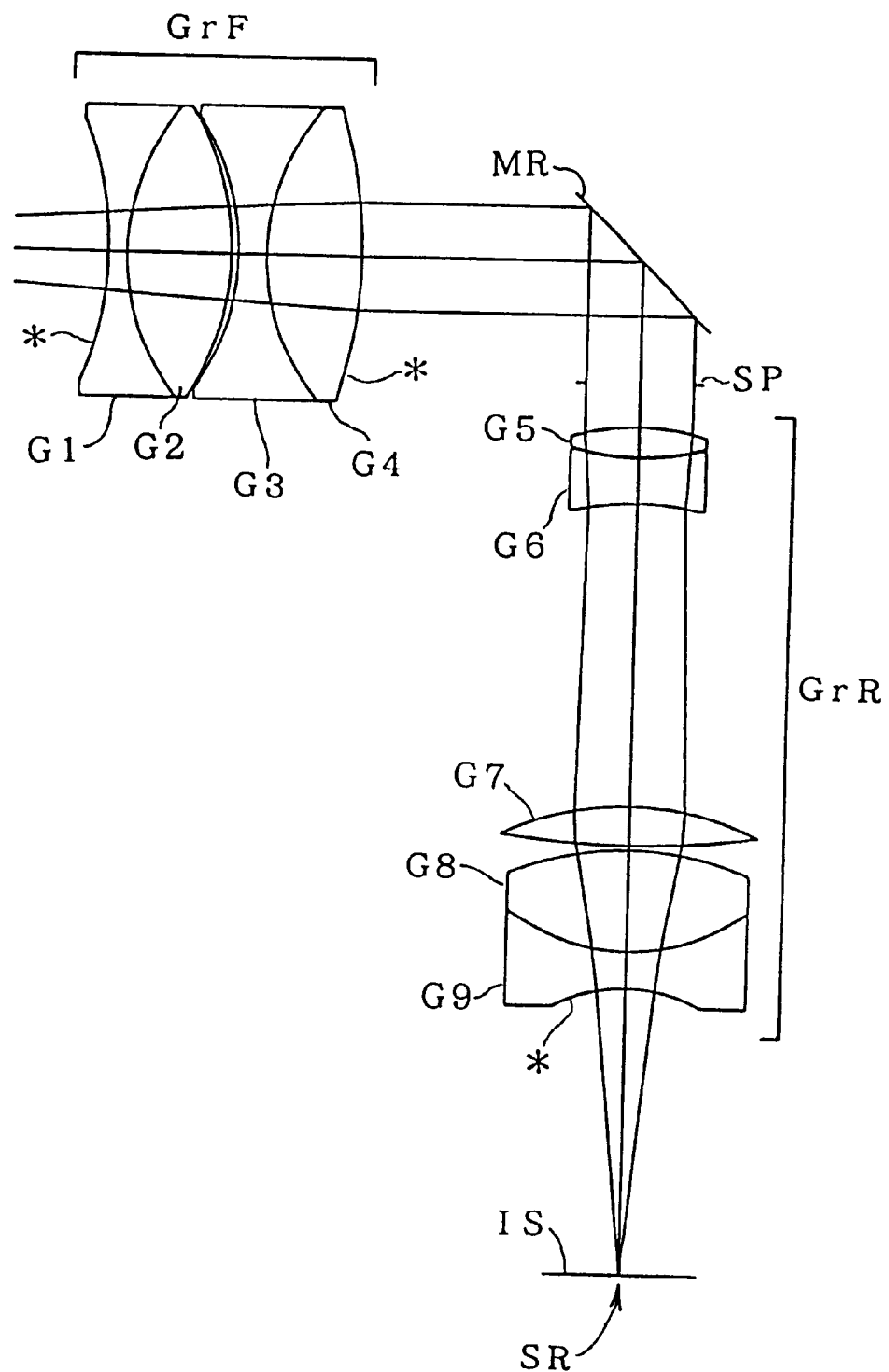
FIG. 10 is a diagram showing the optical construction of a fourth embodiment (Example 4)
Figure 11:
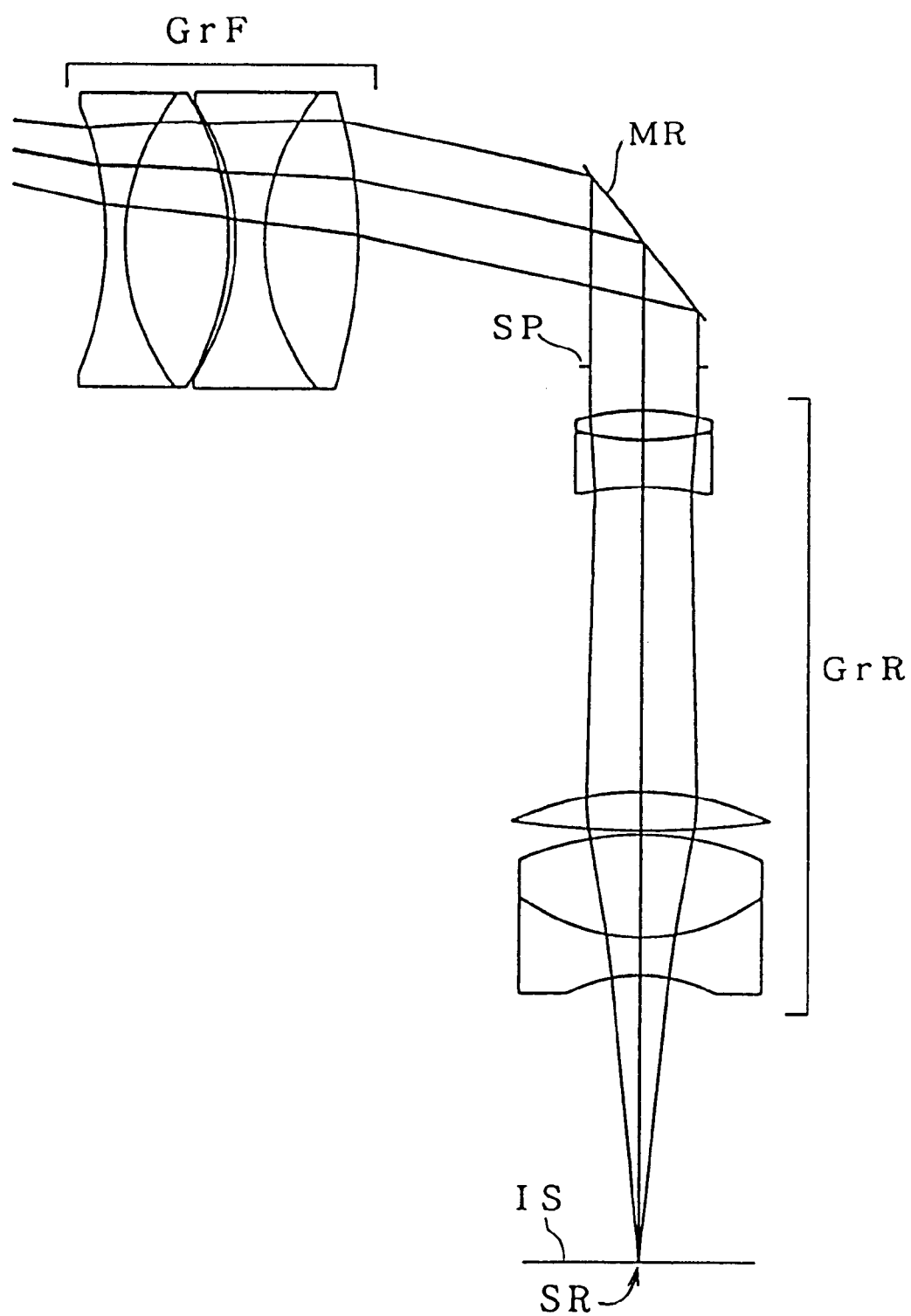
FIG. 11 is a diagram showing the optical construction of the fourth embodiment (Example 4), with the mirror swung to the maximum.
Figure 13:
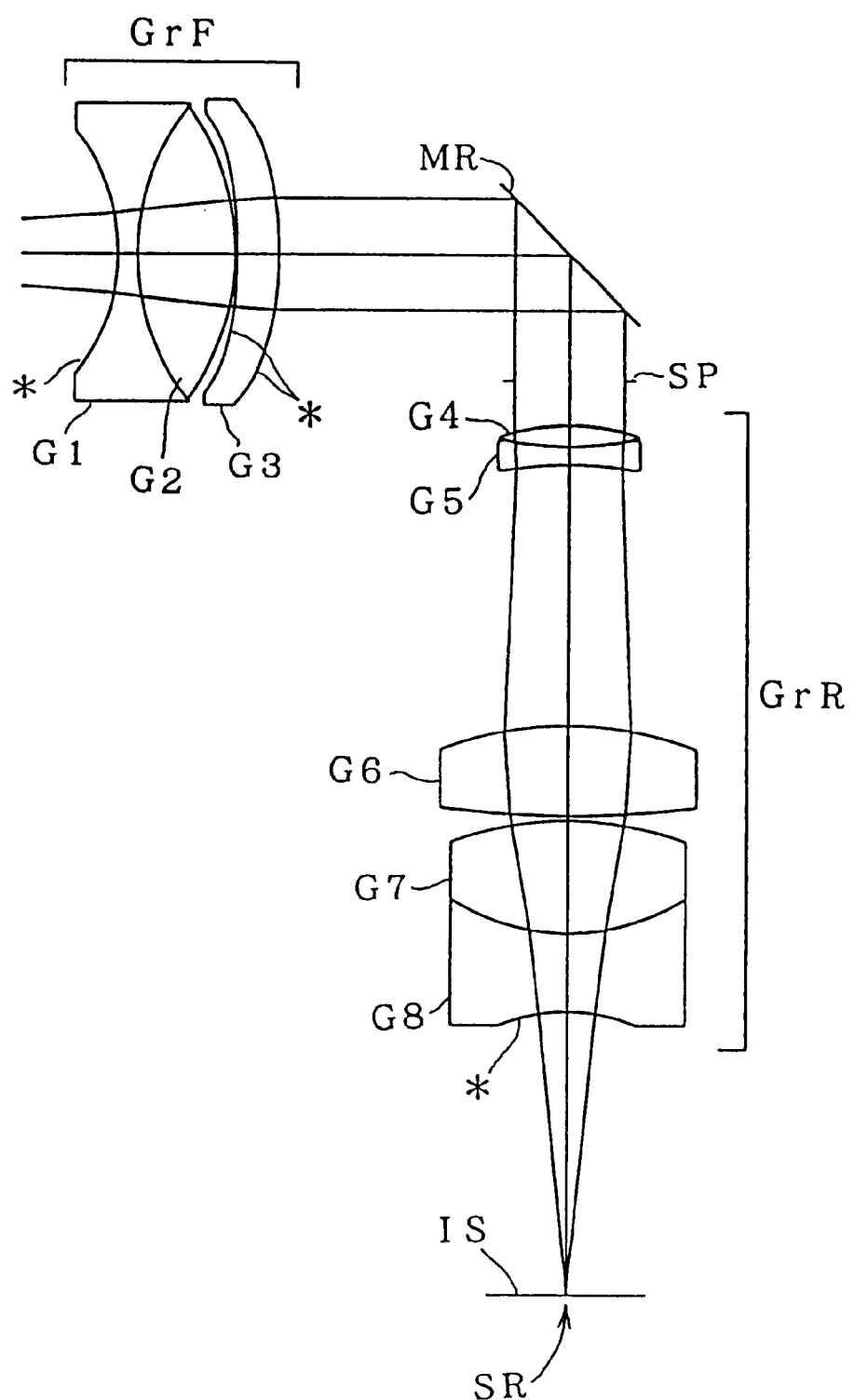
FIG. 13 is a diagram showing the optical construction of a fifth embodiment (Example 5)
Figure 14:
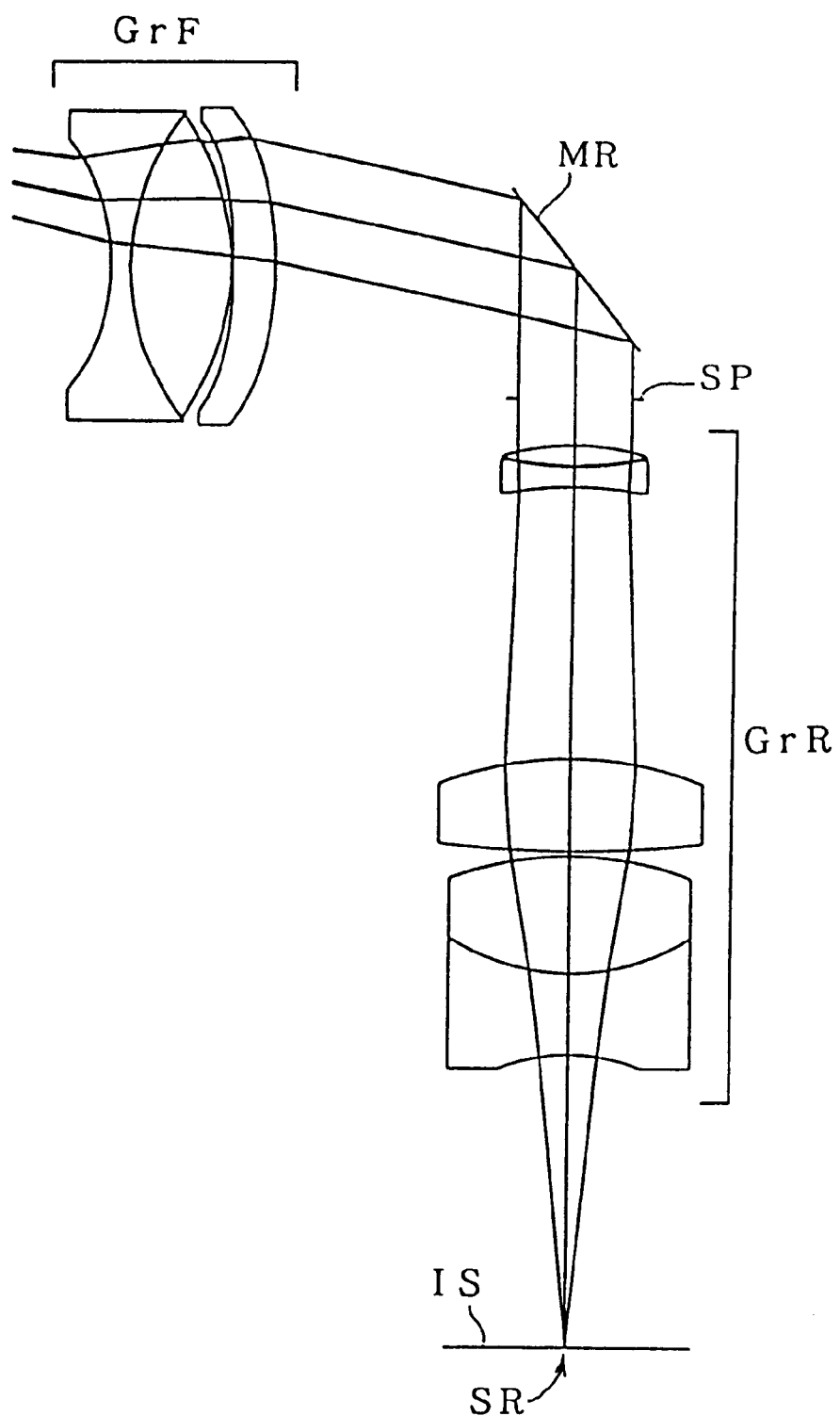
FIG. 14 is a diagram showing the optical construction of the fifth embodiment (example 5), with the mirror swung to the maximum.

Hereinafter, scanning optical systems of a mirror scanning type embodying the present invention will be described with reference to the accompanying drawings. FIGS. 1 and 2, FIGS. 4 and 5, FIGS. 7 and 8, FIGS. 10 and 11, and FIGS. 13 and 14 are diagrams showing the lens arrangement of the scanning optical system of a first, a second, a third, a fourth, and a fifth embodiment, respectively, of the invention. Of these diagrams, FIGS. 1, 4, 7, 10, and 13 show the optical path of axial rays on a sectional plane along the sub scanning direction, and FIGS. 2, 5, 8, 11, and 14 show the optical path of off-axial rays on a sectional plane along the sub scanning direction. In these lens arrangement diagrams, Gi (i=1, 2, 3, . . . ) represents the i-th lens element from the object side, an asterisk (*) indicates an aspherical surface, MR represents a mirror, SP represents an aperture stop, SR represents a one-dimensional line sensor, and IS represents the image surface.

In all of the first to fifth embodiments, the scanning optical system is composed of, from the object (not shown) side, an object-side lens unit (GrF), a mirror (MR), and an image-side lens unit (GrR), and is so constructed as to scan the object by rotating the mirror (MR) so as to swing while forming an image of the object on a one-dimensional line sensor (SR) (in this way, the object is scanned in the sub scanning direction). Accordingly, the light from the object is directed through the object-side lens unit (GrF) to the mirror (MR) so as to be deflected thereby, and is then focused through the image-side lens unit (GrR) on the one-dimensional line sensor so as to form an image thereon. The one-dimensional line sensor (SR) has a trilinear structure (not shown in the Figures); that is, it is composed of three image-sensing devices (for example, line CCDs) that are arranged parallel to each other in the sub scanning direction on the image surface (IS), with each of the image-sensing devices having image-sensing elements arranged in a line along the main scanning direction. It is to be noted that, in a case where the scanning optical system is used as a film scanner, a processed film serves as the object.

In all of the first to fifth embodiments, the object-side lens unit (GrF) includes an aspherical surface (*). To minimize the degradation of optical performance due to mirror rotation and thereby achieve high optical performance with a minimum of constituent lens elements, it is preferable that the object-side lens unit (GrF) include at least one aspherical surface that fulfills the condition (1B) below in a range that fulfills the condition (1A) below. This helps minimize the aberrations occurring in the object-side lens unit (GrF) with a minimum of constituent lens elements and simultaneously minimize the aberrations, such as coma, resulting from mirror rotation.

$$0 < H < Hmax \quad (1A)$$

$$-20.0 < (\phi a - \phi 0a)/\phi AL < 20.0 \quad (1B)$$

where

H represents the height in the direction of a radius of the lens element that has the aspherical surface, Hmax represents the effective radius of the lens element that has the aspherical surface, $\phi a$ represents the local power of the aspherical surface, $\phi 0a$ represents the power of the aspherical surface due to the reference curvature thereof, and $\phi AL$ represents the power of the lens element that has the aspherical surface, where $\phi a$ and $\phi 0a$ are defined by the formulae (1C) and (1D) below:

$$\phi a = Calo(N'-N) \quad (1C)$$

$$\phi 0a = C0(N'-N) \quad (1D)$$

where

Calo represents the local curvature of the aspherical surface at a height H,

C0 represents the reference curvature of the aspherical surface,

N' represents the refractive index of the medium existing on the image side of the aspherical surface, and N represents the refractive index of the medium existing on the object side of the aspherical surface.

If the condition (1B) is not fulfilled, inconveniently, coma, in particular, becomes unduly large, and in addition high-order aberrations occur. In particular, when the aspherical surface is disposed near the aperture stop (SP), if the condition (1B) is not fulfilled, inconveniently, it is difficult to correct the spherical aberration occurring at the aspherical surface with other lens surfaces. On the other hand, when the aspherical surface is disposed far away from the aperture stop (SP), if the condition (1B) is not fulfilled, inconveniently, it is difficult to correct the aberrations, such as distortion and coma, occurring at the aspherical surface, in particular off-axial aberrations, with other lens surfaces.

It is preferable that an aspherical surface that fulfills the condition (1B) in a range that fulfills the condition (1A) be disposed at the object-side end of the object-side lens unit (GrF) (as practiced in the first to fifth embodiments). This makes it possible not only to correct off-axial aberrations, but also to effectively correct the aberrations resulting from mirror rotation. It is preferable that an aspherical surface that fulfills the condition (1B) in a range that fulfills the condition (1A) be disposed at the image-side end of the object-side lens unit (GrIF) (as practiced in the second to fifth embodiments). This makes it possible to effectively correct spherical aberration, in particular.

In a scanning optical system of a mirror scanning type, like those of the first to fifth embodiments, the rotation of the mirror (MR) causes lateral chromatic aberration. To minimize this, it is necessary to set conditions that the individual lens units (GrF and GrR) should preferably fulfill in terms of the correction of chromatic aberration. Moreover, it is preferable to correct aberrations in such a way that the aberrations occurring in one of the lens units (GrF and GrR) are canceled by the aberrations occurring in the other, more specifically in such a way that the aberrations occurring in the object-side lens unit (GrF) are canceled by the aberrations occurring in the image-side lens unit (GrR).

From this perspective, it is preferable that the object-side lens unit (GrF) fulfill the condition (2) below. This helps correct chromatic aberration properly and thereby achieve high optical performance in the scanning optical system.

$$-10.0 < (\Sigma vop - \Sigma vom)/Lo < 20.0 \qquad (2)$$

where $\Sigma vop$ represents the sum of the Abbe numbers of the positive lens elements included in the object-side lens unit (GrF), $\Sigma vop$ represents the sum of the Abbe numbers of the negative lens elements included in the object-side lens unit (GrF), and Lo represents the number of lens elements included in the object-side lens unit (GrF).

If the condition (2) is fulfilled, it is possible to minimize the chromatic aberration occurring in the object-side lens unit (GrF) and thereby minimize longitudinal chromatic aberration, in particular, in the entire scanning optical system. If the upper limit of the condition (2) is transgressed, inconveniently, the chromatic aberration occurring in the positive lens elements included in the object-side lens unit (GrF), in particular, becomes unduly large and makes it difficult to correct the chromatic aberration occurring in the object-side lens unit (GrF) with the image-side lens unit (GrR). If the lower limit of the condition (2) is transgressed, inconveniently, the chromatic aberration occurring in the negative lens elements included in the object-side lens unit (GrF), in particular, becomes unduly large and makes it difficult to correct the chromatic aberration occurring in the object-side lens unit (GrF) with the image-side lens unit (GrR).

In the third to fifth embodiments, an aspherical surface (*) is provided also in the image-side lens unit (GrR). To minimize the degradation of optical performance due to mirror rotation and thereby achieve high optical performance with a minimum of constituent lens elements, it is preferable that, like the object-side lens unit (GrF), the image-side lens unit (GrR) include at least one aspherical surface that fulfills the condition (1B) in a range that fulfills the condition (1A). This helps minimize the aberrations occurring in the image-side lens unit (GrR) with a minimum of constituent lens elements and simultaneously balance the aberrations occurring in the object-side lens unit (GrF) with the aberrations occurring in the image-side lens unit (GrR).

$$0 < H < Hmax \qquad (1A)$$

$$-20.0 < (\phi a - \phi 0a)/\phi AL < 20.0 \qquad (1B)$$

where

H represents the height in the direction of a radius of the lens element that has the aspherical surface, Hmax represents the effective radius of the lens element that has the aspherical surface, $\phi a$ represents the local power of the aspherical surface, $\phi 0a$ represents the power of the aspherical surface due to the reference curvature thereof, and $\phi AL$ represents the power of the lens element that has the aspherical surface, where $\phi a$ and $\phi 0a$ are defined by the formulae (1C) and (1D) below:

$$\phi a = Calo(N'-N) \qquad (1C)$$

$$\phi 0a = C0(N'-N) \qquad (1D)$$

where

Calo represents the local curvature of the aspherical surface at a height H,

C0 represents the reference curvature of the aspherical surface,

N' represents the refractive index of the medium existing on the image side of the aspherical surface, and N represents the refractive index of the medium existing on the object side of the aspherical surface.

If the condition (1B) is not fulfilled, inconveniently, coma, in particular, becomes unduly large, and in addition high-order aberrations occur. In particular when the aspherical surface is disposed near the aperture stop (SP), if the condition (1B) is not fulfilled, inconveniently, it is difficult to correct the spherical aberration occurring at the aspherical surface with other lens surfaces. On the other hand, when the aspherical surface is disposed far away from the aperture stop (SP), if the condition (1B) is not fulfilled, inconveniently, it is difficult to correct the aberrations, such as distortion and coma, occurring at the aspherical surface, in particular off-axial aberrations, with other lens surfaces.

It is preferable that an aspherical surface that fulfills the condition (1B) in a range that fulfills the condition (1A) be disposed at the image-side end of the image-side lens unit (GrR) (as practiced in the third to fifth embodiments). This makes it possible to effectively correct off-axial aberrations.

Moreover, it is preferable that the image-side lens unit (GrR) fulfill the condition (3) below. This helps correct the chromatic aberration occurring in the object-side lens unit (GrF) with the image-side lens unit (GrR) and thereby achieve high optical performance in the scanning optical system.

$$10.0 < (\Sigma vip - \Sigma vim)/Li < 50.0 \qquad (3)$$

where $\Sigma vip$ represents the sum of the Abbe numbers of the positive lens elements included in the image-side lens unit (GrR), $\Sigma vim$ represents the sum of the Abbe numbers of the negative lens elements included in the image-side lens unit (GrR), and Li represents the number of lens elements included in the image-side lens unit (GrR).

If the upper limit of the condition (3) is transgressed, inconveniently, the chromatic aberration occurring in the positive lens elements included in the image-side lens unit (GrR), in particular, becomes unduly large and makes it difficult to correct the chromatic aberration occurring in the object-side lens unit (GrF) with the image-side lens unit (GrR). If the lower limit of the condition (3) is transgressed, inconveniently, the chromatic aberration occurring in the negative lens elements included in the image-side lens unit (GrR), in particular, becomes unduly large and makes it difficult to correct the chromatic aberration occurring in the object-side lens unit (GrF) with the image-side lens unit (GrR).

It is preferable to correct the chromatic aberration occurring in the entire scanning optical system by correcting the chromatic aberration occurring in the object-side lens unit (GrF) with the image-side lens unit (GrR). However, if the chromatic aberration occurring in the individual lens units (GrF and GrR) is too large, inconveniently, large lateral chromatic aberration, in particular, occurs as the mirror (MR) is rotated so as to scan the object. The condition (3) noted above is a condition to be fulfilled to minimize not only longitudinal chromatic aberration but also the lateral chromatic aberration that occurs during scanning using the mirror.

In a scanning optical system of a mirror scanning type, it is preferable that, as in the first to fifth embodiments, the object-side lens unit (GrF) has a cemented lens element, composed of a positive lens element and a negative lens element cemented together, disposed at the object-side end thereof. This helps correct lateral chromatic aberration properly, in particular off-axial aberrations. It is preferable that this cemented lens element fulfill the condition (4) below.

$$|\phi f1/\phi f|<2.0 \qquad (4)$$

where $\phi f1$ represents the power of the cemented lens element disposed at the object-side end of the object-side lens unit (GrF), and $\phi f$ represents the power of the object-side lens unit (GrF).

The condition (4) is a condition to be fulfilled to permit the cemented lens element disposed at the object-side end of the object-side lens unit (GrF) to correct chromatic aberration and also other aberrations, in particular off-axial aberrations. If the upper limit of this condition (4) is transgressed, it is difficult to correct lateral chromatic aberration and various off-axial aberrations with the cemented lens element.

In a scanning optical system of a mirror scanning type, it is preferable that the exit pupil of the object-side lens unit (GrF) substantially coincide with the entrance pupil of the image-side lens unit (GrR). To achieve this, as in the first to fifth embodiments, it is preferable to dispose an aperture stop (SP) common to the object-side and image-side lens units (GrF and GrR) near the scanning mirror (MR).

To correct chromatic aberration, spherical aberration, Petzval sums, and other aberrations properly, it is preferable that the object-side lens unit (GrF) include at least one negative surface (for example, the object-side surface of the third lens element (G3) in the first embodiment). Such a negative surface acts to increase the heights at which rays pass and thereby makes it possible to correct spherical aberration effectively. Moreover, such a negative surface permits even off-axial rays to pass through lens elements at increased heights and is thus effective in correcting off-axial aberrations. It is preferable that off-axial rays, thus made to pass through lens elements at increased heights, pass, near the aperture stop (SP), at heights that substantially coincide with the heights at which axial rays pass. To achieve this, it is preferable that the lens element disposed at the image-side end of the object-side lens unit (GrF) have a concave surface on the image side, or more preferably, have a meniscus shape concave to the image side. This helps make the scanning mirror (MR) compact without sacrificing the aperture efficiency toward off-axial rays.

Moreover, it is preferable that the negative lens elements included in the image-side lens unit (GrR) fulfill the condition (5) below. The condition (5) is a condition to be fulfilled to reduce the chromatic aberration occurring in the image-side lens unit (GrR) to a desired level. If the upper limit of this condition (5) is transgressed, inconveniently, it is difficult to correct the aberrations occurring in the positive lens elements included in the image-side lens unit (GrR) with the negative lens elements included therein.

$$\nu 2m<35.0 \qquad (5)$$

where $\nu 2m$ represents the Abbe number of the negative lens elements included in the image-side lens unit (GrR).

To achieve proper correction of aberrations in the entire scanning optical system, it is necessary to balance the aberrations occurring in the object-side lens unit (GrF) with the aberrations occurring in the image-side lens unit (GrR). In the object-side lens unit (GrF), it is preferable to give the negative lens elements comparatively high powers for correction of chromatic aberration, spherical aberration, and off-axial aberrations. However, if the negative lens elements are given excessively high powers here, large aberrations occur in the negative direction. To correct such negative aberrations, it is preferable to dispose a positive lens surface convex to the object side as the object-side end lens surface of the image-side lens unit (GrR). By disposing a positive lens surface convex to the object side as the object-side end lens surface of the image-side lens unit (GrR) in this way, it is possible to lower the heights at which off-axial rays pass the succeeding lens elements and thereby reduce their lens diameters. Moreover, it is preferable to dispose a surface concave to the image side as the image-side end surface of the image-side lens unit (GrR). By disposing a surface concave to the image side as the image-side end surface of the image-side lens unit (GrR), it is possible to correct off-axial aberrations, in particular distortion, in the desired direction.

In all of the first to fifth embodiments, the individual lens units (GrF and GrR) are each composed only of refractive lens elements that deflect incident light by refraction (i.e. lens elements in which deflection of light occurs at the interface between media having different refractive indices). However, these lens units (GrF and GrR) may be composed of lens elements of any other type, for example diffractive lens elements that deflect incident light by diffraction, refractive/diffractive hybrid lens elements that deflect incident light by a combined effect of diffraction and refraction, or gradient-index lens elements that deflect incident light by refractive indices distributed within a medium.

EXAMPLE

Hereinafter, practical examples of scanning optical systems embodying the present invention will be described with reference to their construction data, aberration diagrams, and others. Examples 1 to 5 presented below correspond to the first to fifth embodiments, respectively, described above, and thus the lens arrangement diagrams of the first to fifth embodiments (FIGS. 1 and 2, FIGS. 4 and 5, FIGS. 7 and 8, FIGS. 10 and 11, and FIGS. 13 and 14) show the construction of Examples 1 to 5, respectively.

Tables 1 to 5 list the construction data of Examples 1 to 5, respectively. In the construction data of each example, Si (i=1, 2, 3, . . . ) represents the i-th surface from the object side, ri (i=1, 2, 3, . . . ) represents the radius of curvature of the i-th surface Si, di (i=1, 2, 3, . . . ) represents the i-th axial distance from the object side, and Ni (i=1, 2, 3, . . . ) and vi (i =1, 2, 3, . . . ) represent the refractive index (Nd) for the d line and the Abbe number (vd), respectively, of the i-th lens element from the object side. A surface Si marked with an asterisk (*) is an aspherical surface, of which the surface shape is defined by the formula (AS) below. Listed together are the aspherical surface data of each aspherical surface, the values of the condition (1B) on that aspherical surface, the object distance (the distance from the object surface to the first surface (Si)) OD, the effective f/number $F_{eff}$, and the mirror swing angles (relative to the position of the mirror (MR) when it is so positioned that the angle of incidence and the angle of reflection are both equal to 450°). Table 6 lists the values of the conditions (2) to (5) in each embodiment.

$$X(H) = (C \cdot H^2)/\{1 + (1 - \varepsilon \cdot C^2 \cdot H^2)^{1/2}\} + \sum_i (Ai \cdot H^i) \quad (AS)$$

where

H represents the height in a direction perpendicular to the optical axis,

X(H) represents the displacement along the optical axis at the height H (relative to the vertex of the surface), C represents the paraxial curvature, $\varepsilon$ represents the quadric surface parameter, and Ai represents the aspherical coefficient of order i.

Figure 3:
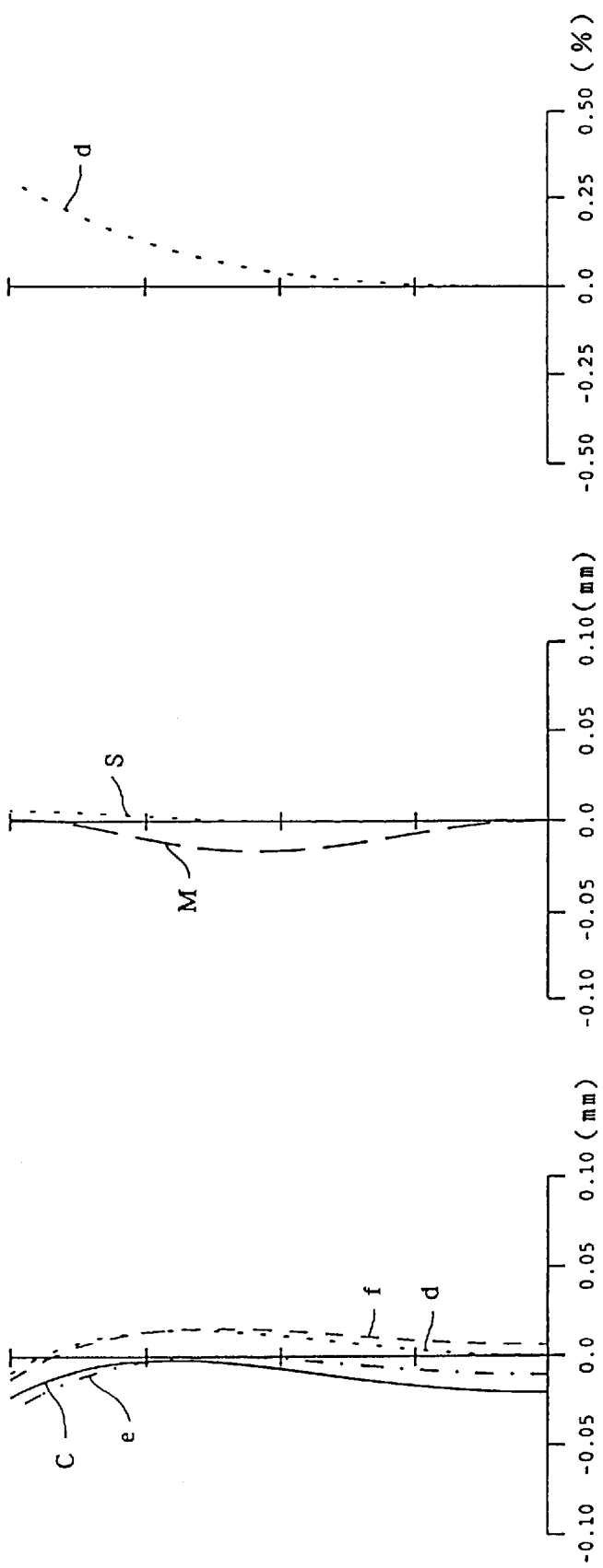
FIGS. 3A to 3C are diagrams showing the aberrations observed in Example 1.
Figure 6:
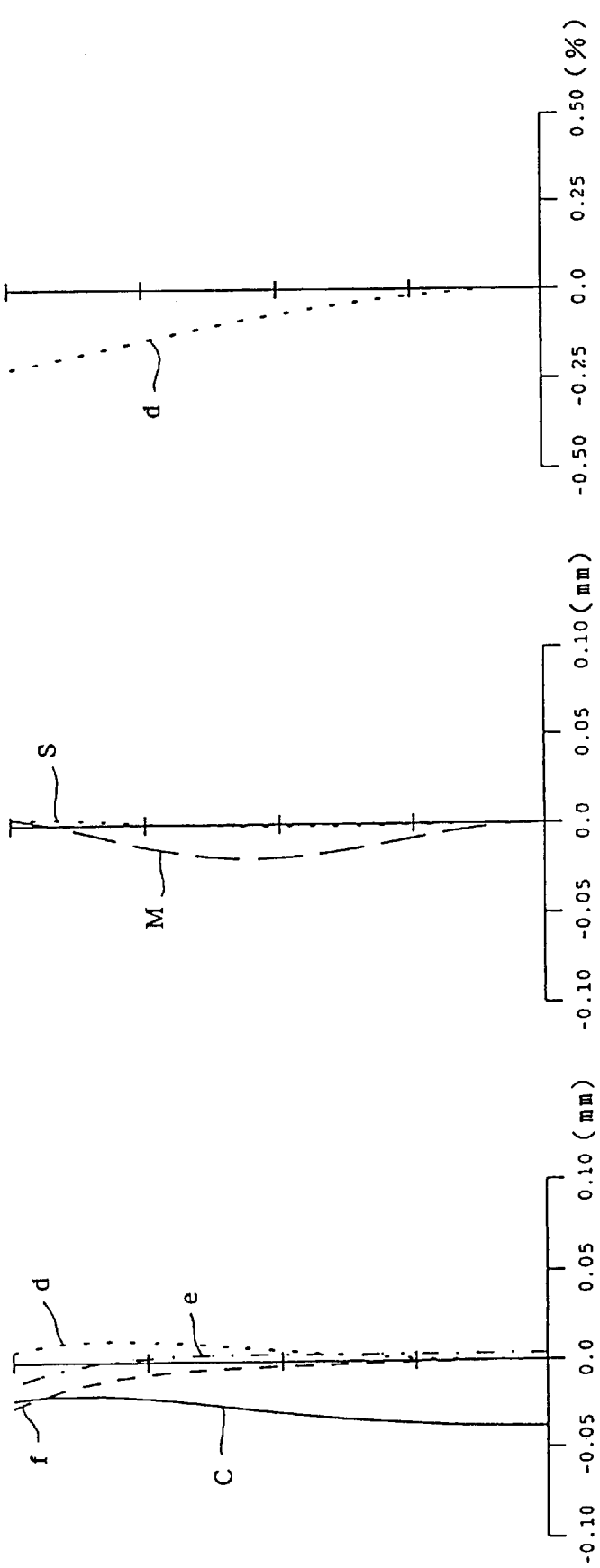
FIGS. 6A to 6C are diagrams showing the aberrations observed in Example 2.
Figure 9:
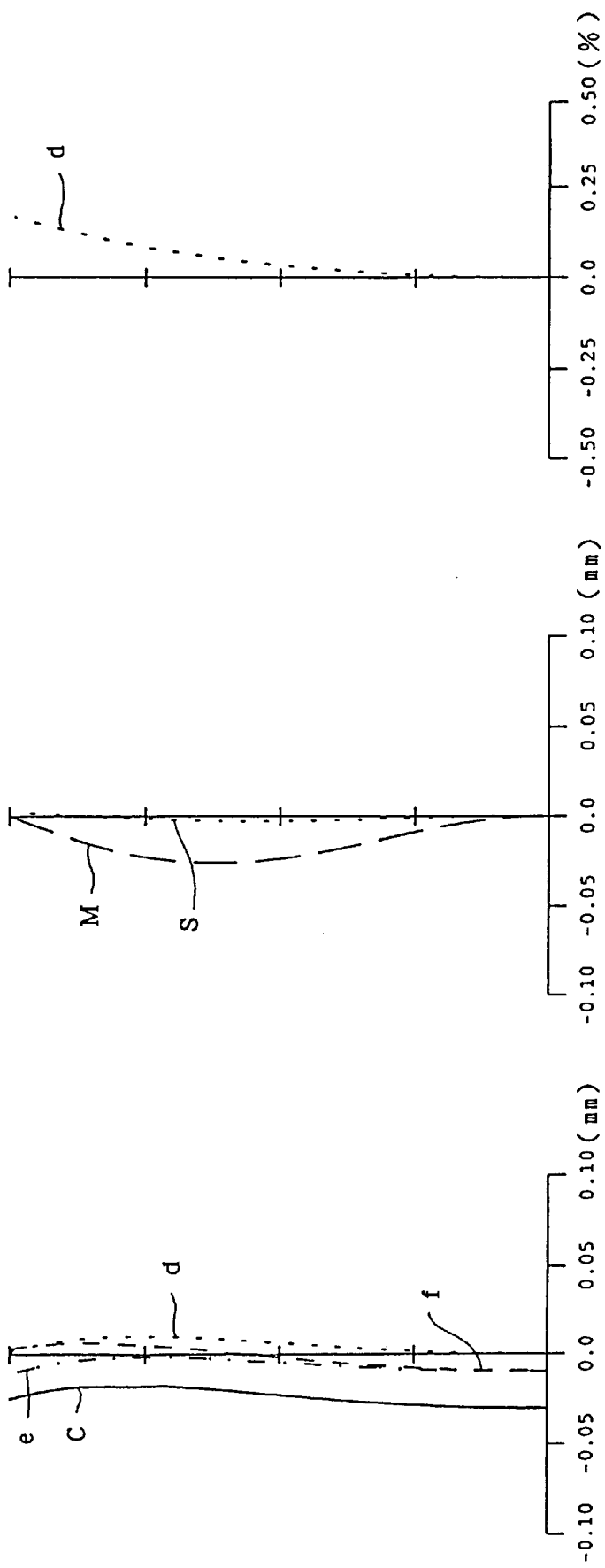
FIGS. 9A to 9C are diagrams showing the aberrations observed in Example 3.

FIGS. 3A, 3B, and 3C, FIGS. 6A, 6B, and 6C, FIGS. 9A, 9B, and 9C, FIGS. 12A, 12B, and 12C, and FIGS. 15A, 15B, and 15C are diagrams showing the aberrations observed in Examples 1 to 5, respectively, when the mirror (MR) is so positioned that the angle of incidence and the angle of reflection are both equal to 450°. Of these diagrams, FIGS. 3A, 6A, 9A, 12A, and 15A show spherical aberration, FIGS. 3B, 6B, 9B, 12B, and 15B shown astigmatism, and FIGS. 3C, 6C, 9C, 12C, and 15C show distortion. In the diagrams showing spherical aberration, a solid line (C) represents the spherical aberration for the C line, a dotted line (d) represents the spherical aberration for the d line, a dash-and-dot line (e) represents the spherical aberration for the e line, and a broken line (f) represents the spherical aberration for the f line. In the diagrams showing astigmatism, a broken line (M) represents the astigmatism observed on the meridional plane, and a dotted line (S) represents the astigmatism observed on the sagittal plane. In the diagrams showing distortion, a dotted line (d) represents the distortion for the d line.

As described above, according to the present invention, it is possible to minimize the degradation of optical performance due to mirror rotation, and achieve high optical performance with a minimum of constituent lens elements. Since it is possible to achieve so high optical performance that not only various monochromatic aberrations and lateral chromatic aberration but also longitudinal chromatic aberration is corrected properly, it is possible to achieve cost reduction by reducing the number of constituent lens elements and eliminating the use of color-separation prisms.

TABLE 1

<<Example 1>>
OD = 60 (mm), $F_{eff}$ = 5.0, Mirror Swing Angles = ±6.1(°)

| Surface | Radius of Curvature | Axial Distance | Refractive Index | Abbe Number | |
|---|---|---|---|---|---|
| S1* | r1 = 87.576 | | | | |
| | | d1 = 2.65 | N1 = 1.83350 | v1 = 21.00 | . . . G1 |
| S2 | r2 = 22.979 | | | | |
| | | d2 = 11.00 | N2 = 1.61800 | v2 = 63.39 | . . . G2 |
| S3 | r3 = 420.339 | | | | |
| | | d3 = 12.77 | | | |
| S4 | r4 = −34.515 | | | | |
| | | d4 = 5.00 | N3 = 1.74000 | v3 = 31.72 | . . . G3 |
| S5 | r5 = 104.986 | | | | |
| | | d5 = 10.52 | N4 = 1.83350 | v4 = 21.00 | . . . G4 |
| S6 | r6 = −48.372 | | | | |
| | | d6 = 0.50 | | | |
| S7 | r7 = 46.457 | | | | |
| | | d7 = 15.00 | N5 = 1.61800 | v5 = 63.39 | . . . G5 |
| S8 | r8 = −72.814 | | | | |
| | | d8 = 3.00 | N6 = 1.74000 | v6 = 31.72 | . . . G6 |
| S9 | r9 = −178.064 | | | | |
| | | d9 = 0.50 | | | |
| S10 | r10 = 27.377 | | | | |
| | | d10 = 8.00 | N7 = 1.83350 | v7 = 21.00 | . . . G7 |
| S11 | r11 = 18.639 | | | | |
| | | d11 = 30.00 | | | |
| S12 | r12 = ∞ (Mirror) . . . MR | | | | |
| | | d12 = 13.00 | | | |
| S13 | r13 = ∞ (Aperture Stop) . . . SP | | | | |
| | | d13 = 4.50 | | | |
| S14 | r14 = 20.912 | | | | |
| | | d14 = 4.17 | N8 = 1.61800 | v8 = 63.39 | . . . G8 |
| S15 | r15 = −536.294 | | | | |
| | | d15 = 0.10 | | | |
| S16 | r16 = −191.577 | | | | |
| | | d16 = 5.00 | N9 = 1.84666 | v9 = 23.82 | . . . G9 |
| S17 | r17 = 19.281 | | | | |
| | | d17 = 13.03 | | | |
| S18 | r18 = 42.432 | | | | |
| | | d18 = 4.59 | N10 = 1.83350 | v10 = 21.00 | . . . G10 |
| S19 | r19 = −49.886 | | | | |
| | | d19 = 3.12 | | | |

TABLE 1-continued

<<Example 1>>
OD = 60 (mm), $F_{eff}$ = 5.0, Mirror Swing Angles = ±6.1(°)

| Surface | Radius of Curvature | Axial Distance | Refractive Index | Abbe Number |
|---|---|---|---|---|
| S20 | r20 = 21.569 | | | |
| | | d20 = 5.52 | N11= 1.61800 | ν11 = 63.39 . . . G11 |
| S21 | r21 = −35.523 | | | |
| | | d21 = 4.00 | N12= 1.75000 | ν12= 25.14 . . . G12 |
| S22 | r22 = 15.203 | | | |

[Aspherical Surface Data of the First Surface (S1)]
ϵ = 1
A4 = 1.03015 × $10^{-4}$
A6 = 1.58047 × $10^{-9}$
A8 = −3.18245 × $10^{-12}$
A10 = 5.67954 × $10^{-15}$

[Values of the Condition (1B) on the First Surface (S1)]
H = 0.0 Hmax . . . (φ)a-φ0a)/φAL = 0.000
H = 0.1 Hmax . . . (φ)a-φ0a)/φAL = −0.002
H = 0.2 Hmax . . . (φ)a-φ0a)/φAL = −0.008
H = 0.3 Hmax . . . (φ)a-φ0a)/φAL = −0.022
H = 0.4 Hmax . . . (φ)a-φ0a)/φAL = −0.050
H = 0.5 Hmax . . . (φ)a-φ0a)/φAL = −0.096
H = 0.6 Hmax . . . (φ)a-φ0a)/φAL = −0.166
H = 0.7 Hmax . . . (φ)a-φ0a)/φAL = −0.265
H = 0.8 Hmax . . . (φ)a-φ0a)/φAL = −0.401
H = 0.9 Hmax . . . (φ)a-φ0a)/φAL = −0.584
H = 1.0 Hmax . . . (φ)a-φ0a)/φAL = −0.837

TABLE 2

<<Example 2>>
OD = 60 (mm), $F_{eff}$ = 5.0, Mirror Swing Angles = ±6.1(°)

| Surface | Radius of Curvature | Axial Distance | Refractive Index | Abbe Number |
|---|---|---|---|---|
| S1* | r1 = −240.818 | | | |
| | | d1 = 5.00 | N1 = 1.80518 | ν1 = 25.46 . . . G1 |
| S2 | r2 = 21.437 | | | |
| | | d2 = 11.45 | N2 = 1.75450 | ν2 = 51.57 . . . G2 |
| S3 | r3 = −38.129 | | | |
| | | d3 = 1.08 | | |
| S4 | r4 = −29.793 | | | |
| | | d4 = 8.00 | N3 = 1.75000 | ν3 = 25.14 . . . G3 |
| S5 | r5 = 55.610 | | | |
| | | d5 = 18.00 | N4 = 1.83350 | ν4 = 21.00 . . . G4 |
| S6 | r6 = −45.757 | | | |
| | | d6 = 0.50 | | |
| S7 | r7 = 22.246 | | | |
| | | d7 = 5.98 | N5 = 1.83350 | ν5 = 21.00 . . . G5 |
| S8* | r8 = 18.766 | | | |
| | | d8 = 30.00 | | |
| S9 | r9 = ∞ (Mirror) . . . MR | | | |
| | | d9 = 13.00 | | |
| S10 | r10 = ∞ (Aperture Stop) . . . SP | | | |
| | | d10 = 4.50 | | |
| S11 | r11 = 22.878 | | | |
| | | d11 = 10.00 | N6 = 1.61800 | ν6 = 63.39 . . . G6 |
| S12 | r12 = −56.332 | | | |
| | | d12 = 0.10 | | |
| S13 | r13 = −45.918 | | | |
| | | d13 = 5.00 | N7 = 1.80835 | ν7 = 22.60 . . . G7 |
| S14 | r14 = 21.599 | | | |
| | | d14 = 16.66 | | |
| S15 | r15 = 67.906 | | | |
| | | d15 = 4.00 | N8 = 1.83350 | ν8 = 21.00 . . . G8 |
| S16 | r16 = −45.408 | | | |
| | | d16 = 4.70 | | |
| S17 | r17 = 27.068 | | | |
| | | d17 = 12.00 | N9 = 1.61800 | ν9 = 63.39 . . . G9 |
| S18 | r18 = −33.007 | | | |
| | | d18 = 4.00 | N10 = 1.84666 | ν10= 23.82 . . . G10 |
| S19 | r19 = 21.937 | | | |

TABLE 2-continued

<<Example 2>>
OD = 60 (mm), $F_{eff}$ = 5.0, Mirror Swing Angles = ±6.1(°)

| Surface | Radius of Curvature | Axial Distance | Refractive Index | Abbe Number |
|---|---|---|---|---|

[Aspherical Surface Data of the First Surface (S1)]
$\epsilon = 1$
$A4 = -2.10775 \times 10^{-6}$
$A6 = 1.13321 \times 10^{-9}$
$A8 = 4.71194 \times 10^{-12}$
$A10 = -2.04045 \times 10^{-15}$
[Aspherical Surface Data of the Eighths Surface (S8)]
$\epsilon = 1$
$A4 = -3.95937 \times 10^{-7}$
$A6 = -4.00178 \times 10^{-9}$
$A8 = 2.89977 \times 10^{-11}$
$A10 = -8.97230 \times 10^{-14}$
[Values of the Condition (1B) on the First Surface (S1)]
H = 0.0 Hmax . . . $(\phi)a-\phi 0a)/\phi AL$ = 0.000
H = 0.1 Hmax . . . $(\phi)a-\phi 0a)/\phi AL$ = -0.002
H = 0.2 Hmax . . . $(\phi)a-\phi 0a)/\phi AL$ = -0.008
H = 0.3 Hmax . . . $(\phi)a-\phi 0a)/\phi AL$ = -0.017
H = 0.4 Hmax . . . $(\phi)a-\phi 0a)/\phi AL$ = -0.030
H = 0.5 Hmax . . . $(\phi)a-\phi 0a)/\phi AL$ = -0.045
H = 0.6 Hmax . . . $(\phi)a-\phi 0a)/\phi AL$ = -0.063
H = 0.7 Hmax . . . $(\phi)a-\phi 0a)/\phi AL$ = -0.081
H = 0.8 Hmax . . . $(\phi)a-\phi 0a)/\phi AL$ = -0.098
H = 0.9 Hmax . . . $(\phi)a-\phi 0a)/\phi AL$ = -0.111
H = 1.0 Hmax . . . $(\phi)a-\phi 0a)/\phi AL$ = -0.118
[Values of the Condition (1B) on the Eighth Surface (S8)]
H = 0.0 Hmax . . . $(\phi)a-\phi 0a)/\phi AL$ = 0.000
H = 0.1 Hmax . . . $(\phi)a-\phi 0a)/\phi AL$ = -0.003
H = 0.2 Hmax . . . $(\phi)a-\phi 0a)/\phi AL$ = -0.015
H = 0.3 Hmax . . . $(\phi)a-\phi 0a)/\phi AL$ = -0.035
H = 0.4 Hmax . . . $(\phi)a-\phi 0a)/\phi AL$ = -0.065
H = 0.5 Hmax . . . $(\phi)a-\phi 0a)/\phi AL$ = -0.102
H = 0.6 Hmax . . . $(\phi)a-\phi 0a)/\phi AL$ = -0.137
H = 0.7 Hmax . . . $(\phi)a-\phi 0a)/\phi AL$ = -0.164
H = 0.8 Hmax . . . $(\phi)a-\phi 0a)/\phi AL$ = -0.179
H = 0.9 Hmax . . . $(\phi)a-\phi 0a)/\phi AL$ = -0.188
H = 1.0 Hmax . . . $(\phi)a-\phi 0a)/\phi AL$ = -0.210

TABLE 3

<<Example 3>>
OD = 60 (mm), $F_{eff}$ = 5.0, Mirror Swing Angles = ±6.1(°)

| Surface | Radius of Curvature | Axial Distance | Refractive Index | Abbe Number |
|---|---|---|---|---|
| S1* | r1 = -226.684 | | | |
| | | d1 = 2.99 | N1 = 1.80518 | ν1 = 25.46 . . . G1 |
| S2 | r2 = 21.005 | | | |
| | | d2 = 12.44 | N2 = 1.75450 | ν2 = 51.57 . . . G2 |
| S3 | r3 = -38.097 | | | |
| | | d3 = 1.09 | | |
| S4 | r4 = -29.576 | | | |
| | | d4 = 8.00 | N3 = 1.75000 | ν3 = 25.14 . . . G3 |
| S5 | r5 = 50.853 | | | |
| | | d5 = 17.65 | N4 = 1.83350 | ν4 = 21.00 . . . G4 |
| S6 | r6 = -45.558 | | | |
| | | d6 = 0.50 | | |
| S7 | r7 = 22.253 | | | |
| | | d7 = 5.82 | N5 = 1.83350 | ν5 = 21.00 . . . G5 |
| S8* | r8 = 18.919 | | | |
| | | d8 = 30.00 | | |
| S9 | r9 = ∞ (Mirror) . . . MR | | | |
| | | d9 = 13.00 | | |
| S10 | r10 = ∞ (Aperture Stop) . . . SP | | | |
| | | d10 = 4.50 | | |
| S11 | r11 = 23.634 | | | |
| | | d11 = 7.06 | N6 = 1.61800 | ν6 = 63.39 . . . G6 |
| S12 | r12 = -54.360 | | | |
| | | d12 = 0.10 | | |

TABLE 3-continued

<<Example 3>>
OD = 60 (mm), $F_{eff}$ = 5.0, Mirror Swing Angles = ±6.1(°)

| Surface | Radius of Curvature | Axial Distance | Refractive Index | Abbe Number |
|---|---|---|---|---|
| S13 | r13 = −46.426 | | | |
| | | d13 = 3.33 | N7 = 1.80835 | ν7 = 22.60 . . . G7 |
| S14 | r14 = 23.651 | | | |
| | | d14 = 18.39 | | |
| S15 | r15 = 68.159 | | | |
| | | d15 = 9.10 | N8 = 1.83350 | ν8 = 21.00 . . . G8 |
| S16 | r16 = −47.259 | | | |
| | | d16 = 6.02 | | |
| S17 | r17 = 26.539 | | | |
| | | d17 = 12.00 | N9 = 1.61800 | ν9 = 63.39 . . . G9 |
| S18 | r18 = −27.787 | | | |
| | | d18 = 4.00 | N10 = 1.84666 | ν10 = 23.82 . . . G10 |
| S19* | r19 = 20.757 | | | |

[Aspherical Surface Data of the First Surface (S1)]
ε = 1
A4 = −2.03955 × 10-6
A6 = 1.29925 × $10^{-9}$
A8 = 5.40013 × $10^{-12}$
A10 = −3.21841 × $10^{-15}$
[Aspherical Surface Data of the Eighth Surface (S8)]
ε = 1
A4 = −3.96735 × $10^{-7}$
A6 = −2.24194 × $10^{-9}$
A8 = 2.09523 × $10^{-11}$
A10 = −6.26894 × $10^{-14}$
[Aspherical Surface Data of the Nineteenth Surface (S19)]
ε = 1
A4 = 1.30776 × $10^{-6}$
A6 = −2.39232 × $10^{-8}$
A8 = 9.13792 × $10^{-11}$
A10 = −1.18242 × $10^{-12}$
[Values of the Condition (1B) on the First Surface (S1)]
H = 0.0 Hmax . . . (φa-φ0a)/φAL = 0.000
H = 0.1 Hmax . . . (φa-φ0a)/φAL = −0.002
H = 0.2 Hmax . . . (φa-φ0a)/φAL = −0.007
H = 0.3 Hmax . . . (φa-φ0a)/φAL = −0.016
H = 0.4 Hmax . . . (φa-φ0a)/φAL = −0.028
H = 0.5 Hmax . . . (φa-φ0a)/φAL = −0.043
H = 0.6 Hmax . . . (φa-φ0a)/φAL = −0.059
H = 0.7 Hmax . . . (φa-φ0a)/φAL = −0.076
H = 0.8 Hmax . . . (φa-φ0a)/φAL = −0.091
H = 0.9 Hmax . . . (φa-φ0a)/φAL = −0.102
H = 1.0 Hmax . . . (φa-φ0a)/φAL = −0.105
[Values of the Condition (1B) on the Eighth Surface (S8)]
H = 0.0 Hmax . . . (φa-φ0a)/φAL = 0.000
H = 0.1 Hmax . . . (φa-φ0a)/φAL = −0.004
H = 0.2 Hmax . . . (φa-φ0a)/φAL = −0.016
H = 0.3 Hmax . . . (φa-φ0a)/φAL = −0.035
H = 0.4 Hmax . . . (φa-φ0a)/φAL = −0.062
H = 0.5 Hmax . . . (φa-φ0a)/φAL = −0.092
H = 0.6 Hmax . . . (φa-φ0a)/φAL = −0.117
H = 0.7 Hmax . . . (φa-φ0a)/φAL = −0.131
H = 0.8 Hmax . . . (φa-φ0a)/φAL = −0.129
H = 0.9 Hmax . . . (φa-φ0a)/φAL = −0.118
H = 1.0 Hmax . . . (φa-φ0a)/φAL = −0.116
[Values of the Condition (1B) on the Nineteenth Surface (S19)]
H = 0.0 Hmax(φa-φ0a)/φAL = 0.000
H = 0.1 Hmax(φa-φ0a)/φAL = 0.000
H = 0.2 Hmax(φa-φ0a)/φAL = 0.002
H = 0.3 Hmax(φa-φ0a)/φAL = 0.003
H = 0.4 Hmax(φa-φ0a)/φAL = 0.004
H = 0.5 Hmax(φa-φ0a)/φAL = 0.004
H = 0.6 Hmax(φa-φ0a)/φAL = 0.003
H = 0.7 Hmax(φa-φ0a)/φAL = −0.002
H = 0.8 Hmax(φa-φ0a)/φAL = −0.012
H = 0.9 Hmax(φa-φ0a)/φAL = −0.028
H = 1.0 Hmax(φa-φ0a)/φAL = −0.054

TABLE 4

<<Example 4>>
OD = 60 (mm), $F_{eff}$ = 5.0, Mirror Swing Angles = ±6.1(°)

| Surface | Radius of Curvature | Axial Distance | Refractive Index | Abbe Number |
|---|---|---|---|---|
| S1* | r1 = −40.661 | | | |
| | | d1 = 2.00 | N1 = 1.67741 | ν1 = 28.50 . . . G1 |
| S2 | r2 = 24.393 | | | |
| | | d2 = 11.00 | N2 = 1.81600 | ν2 = 46.57 . . . G2 |
| S3 | r3 = −28.809 | | | |
| | | d3 = 0.75 | | |
| S4 | r4 = −26.020 | | | |
| | | d4 = 3.00 | N3 = 1.75000 | ν3 = 25.14 . . . G3 |
| S5 | r5 = 23.717 | | | |
| | | d5 = 10.00 | N4 = 1.83350 | ν4 = 21.00 . . . G4 |
| S6* | r6 = −49.166 | | | |
| | | d6 = 30.00 | | |
| S7 | r7 = ∞ (Mirror) . . . MR | | | |
| | | d7 = 13.00 | | |
| S8 | r8 = ∞ (Aperture Stop) . . . SP | | | |
| | | d8 = 4.50 | | |
| S9 | r9 = 25.882 | | | |
| | | d9 = 3.00 | N5 = 1.61800 | ν5 = 63.39 . . . G5 |
| S10 | r10 = −27.926 | | | |
| | | d10 = 0.10 | | |
| S11 | r11 = −27.294 | | | |
| | | d11 = 5.00 | N6 = 1.74000 | ν6 = 31.72 . . . G6 |
| S12 | r12 = 29.115 | | | |
| | | d12 = 32.17 | | |
| S13 | r13 = 32.811 | | | |
| | | d13 = 4.00 | N7 = 1.83350 | ν7 = 21.00 . . . G7 |
| S14 | r14 = −96.006 | | | |
| | | d14 = 0.50 | | |
| S15 | r15 = 32.521 | | | |
| | | d15 = 10.81 | N8 = 1.61800 | ν8 = 63.39 . . . G8 |
| S16 | r16 = −21.874 | | | |
| | | d16 = 4.00 | N9 = 1.83350 | ν9 = 21.00 . . . G9 |
| S17* | r17 = 17.918 | | | |

[Aspherical Surface Data of the First Surface (S1)]
ε = 1
A4 = −7.04157 × 10$^{-6}$
A6 = 6.94121 × 10$^{-9}$
A8 = −3.17757 × 10$^{-11}$
A10 = 1.62002 × 10$^{-13}$
[Aspherical Surface Data of the Sixth Surface (S6)]
ε = 1
A4 = 6.28516 × 10$^{-7}$
A6 = 4.83959 × 10$^{-9}$
A8 = 6.47816 × 10$^{-12}$
A10 = −8.36037 × 10$^{-15}$
[Aspherical Surface Data of the Seventeenth Surface (S17)]
ε = 1
A4 = 1.28867 × 10$^{-5}$
A6 = −5.25890 × 10$^{-8}$
A8 = 1.53751 × 10$^{-9}$
A10 = −1.73218 × 10$^{-11}$
[Values of the Condition (1B) on the First Surface (S1)]
H = 0.0 Hmax . . . (φ)a-φ0a)/φAL = 0.000
H = 0.1 Hmax . . . (φ)a-φ0a)/φAL = −0.003
H = 0.2 Hmax . . . (φ)a-φ0a)/φAL = −0.013
H = 0.3 Hmax . . . (φ)a-φ0a)/φAL = −0.028
H = 0.4 Hmax . . . (φ)a-φ0a)/φAL = −0.048
H = 0.5 Hmax . . . (φ)a-φ0a)/φAL = −0.073
H = 0.6 Hmax . . . (φ)a-φ0a)/φAL = −0.101
H = 0.7 Hmax . . . (φ)a-φ0a)/φAL = −0.130
H = 0.8 Hmax . . . (φ)a-φ0a)/φAL = −0.158
H = 0.9 Hmax . . . (φ)a-φ0a)/φAL = −0.181
H = 1.0 Hmax . . . (φ)a-φ0a)/φAL = −0.193
[Values of the Condition (1B) on the Sixth Surface (S6)]
H = 0.0 Hmax . . . (φ)a-φ0a)/φAL = 0.000
H = 0.1 Hmax . . . (φ)a-φ0a)/φAL = 0.002
H = 0.2 Hmax . . . (φ)a-φ0a)/φAL = 0.008
H = 0.3 Hmax . . . (φ)a-φ0a)/φAL = 0.021
H = 0.4 Hmax . . . (φ)a-φ0a)/φAL = 0.043
H = 0.5 Hmax . . . (φ)a-φ0a)/φAL = 0.080
H = 0.6 Hmax . . . (φ)a-φ0a)/φAL = 0.138
H = 0.7 Hmax . . . (φ)a-φ0a)/φAL = 0.224
H = 0.8 Hmax . . . (φ)a-φ0a)/φAL = 0.349

TABLE 4-continued

<<Example 4>>
OD = 60 (mm), $F_{eff}$ = 5.0, Mirror Swing Angles = ±6.1(°)

| Surface | Radius of Curvature | Axial Distance | Refractive Index | Abbe Number |
|---|---|---|---|---|

H = 0.9 Hmax ... ($\phi$)a-$\phi$0a)/$\phi$AL = 0.522
H = 1.0 Hmax ... ($\phi$)a-$\phi$0a)/$\phi$AL = 0.755
[Values of the Condition (1B) on the Seventh Surface (S17)]
H = 0.0 Hmax ... ($\phi$)a-$\phi$0a)/$\phi$AL = 0.000
H = 0.1 Hmax ... ($\phi$a-$\phi$0a)/$\phi$AL = 0.003
H = 0.2 Hmax ... ($\phi$a-$\phi$0a)/$\phi$AL = 0.011
H = 0.3 Hmax ... ($\phi$a-$\phi$0a)/$\phi$AL = 0.023
H = 0.4 Hmax ... ($\phi$a-$\phi$0a)/$\phi$AL = 0.039
H = 0.5 Hmax ... ($\phi$a-$\phi$0a)/$\phi$AL = 0.058
H = 0.6 Hmax ... ($\phi$a-$\phi$0a)/$\phi$AL = 0.078
H = 0.7 Hmax ... ($\phi$a-$\phi$0a)/$\phi$AL = 0.096
H = 0.8 Hmax ... ($\phi$a-$\phi$0a)/$\phi$AL = 0.100
H = 0.9 Hmax ... ($\phi$a-$\phi$0a)/$\phi$AL = 0.068
H = 1.0 Hmax ... ($\phi$a-$\phi$0a)/$\phi$AL = -0.039

TABLE 5

<<Example 5>>
OD = 60 (mm), $F_{eff}$ = 5.0, Mirror Swing Angles = ±6.1(°)

| Surface | Radius of Curvature | Axial Distance | Refractive Index | Abbe Number |
|---|---|---|---|---|
| S1* | r1 = -22.696 | | | |
| | | d1 = 2.00 | N1 = 1.68150 | ν1 = 36.64 ... G1 |
| S2 | r2 = 24.425 | | | |
| | | d2 = 10.00 | N2 = 1.75450 | ν2 = 51.57 ... G2 |
| S3 | r3 = -26.322 | | | |
| | | d3 = 0.30 | | |
| S4* | r4 = -44.259 | | | |
| | | d4 = 4.24 | N3 = 1.83350 | ν3 = 21.00 ... G3 |
| S5* | r5 = -37.467 | | | |
| | | d5 = 30.00 | | |
| S6 | r6 = ∞ (Mirror) ... MR | | | |
| | | d6 = 13.00 | | |
| S7 | r7 = ∞ (Aperture Stop) ... SP | | | |
| | | d7 = 4.50 | | |
| S8 | r8 = 25.667 | | | |
| | | d8 = 2.00 | N4 = 1.49310 | ν4 = 83.58 ... G4 |
| S9 | r9 = -33.243 | | | |
| | | d9 = 0.10 | | |
| S10 | r10 = -33.114 | | | |
| | | d10 = 2.00 | N5 = 1.74000 | ν5 = 31.72 ... G5 |
| S11 | r11 = 38.372 | | | |
| | | d11 = 26.95 | | |
| S12 | r12 = 35.318 | | | |
| | | d12 = 9.39 | N6 = 1.83350 | ν6 = 21.00 ... G6 |
| S13 | r13 = -105.833 | | | |
| | | d13 = 0.50 | | |
| S14 | r14 = 35.293 | | | |
| | | d14 = 11.64 | N7 = 1.61800 | ν7 = 63.39 ... G7 |
| S15 | r15 = -22.588 | | | |
| | | d15 = 8.00 | N8 = 1.83350 | ν8 = 21.00 ... G8 |
| S16* | r16 = 19.380 | | | |

[Aspherical Surface Data of the First Surface (S1)]
$\epsilon$ = 1
A4 = -3.11429 × 10$^{-5}$
A6 = 9.63751 × 10$^{-8}$
A8 = -1.29163 × 10$^{-10}$
A10 = -1.42112 × 10$^{-13}$
[Aspherical Surface Data of the Fourth Surface (S4)]
$\epsilon$ = 1
A4 = 1.05950 × 10$^{-5}$
A6 = -1.80739 × 10$^{-7}$
A8 = 2.39531 × 10$^{-10}$
A10 = -6.39703 × 10$^{-13}$
[Aspherical Surface Data of the Fifth Surface (S5)]
$\epsilon$ = 1
A4 = 3.75908 × 10$^{-6}$
A6 = -1.16478 × 10$^{-7}$ TABLE 5-continued <<Example 5>>
OD = 60 (mm), $F_{eff}$ = 5.0, Mirror Swing Angles = ±6.1(°)

| Surface | Radius of Curvature | Axial Distance | Refractive Index | Abbe Number |
|---|---|---|---|---|

A8 = 1.61783 × 10⁻¹⁰
A10 = −2.47865 × 10⁻¹³
[Aspherical Surface Data of the Sixteenth Surface (S16)]
ε = 1
A4 = 2.06279 × 10⁻⁵
A6 = −8.17264 × 10⁻⁹
A8 = 1.40698 × 10⁻⁹
A10 = −1.70768 × 10⁻¹¹
[Values of the Condition (1B) on the First Surface (S1)]
H = 0.0 Hmax . . . (φa−φ0a)/φAL = 0.000
H = 0.1 Hmax . . . (φa−φ0a)/φAL = −0.034
H = 0.2 Hmax . . . (φa−φ0a)/φAL = −0.130
H = 0.3 Hmax . . . (φa−φ0a)/φAL = −0.275
H = 0.4 Hmax . . . (φa−φ0a)/φAL = −0.446
H = 0.5 Hmax . . . (φa−φ0a)/φAL = −0.616
H = 0.6 Hmax . . . (φa−φ0a)/φAL = −0.756
H = 0.7 Hmax . . . (φa−φ0a)/φAL = −0.842
H = 0.8 Hmax . . . (φa−φ0a)/φAL = −0.859
H = 0.9 Hmax . . . (φa−φ0a)/φAL = −0.806
H = 1.0 Hmax . . . (φa−φ0a)/φAL = −0.698
[Values of the Condition (1B) on the Fourth Surface (S4)]
H = 0.0 Hmax . . . (φa−φ0a)/φAL = 0.000
H = 0.1 Hmax . . . (φa−φ0a)/φAL = 0.032
H = 0.2 Hmax . . . (φa−φ0a)/φAL = 0.102
H = 0.3 Hmax . . . (φa−φ0a)/φAL = 0.143
H = 0.4 Hmax . . . (φa−φ0a)/φAL = 0.049
H = 0.5 Hmax . . . (φa−φ0a)/φAL = −0.310
H = 0.6 Hmax . . . (φa−φ0a)/φAL = −1.076
H = 0.7 Hmax . . . (φa−φ0a)/φAL = −2.391
H = 0.8 Hmax . . . (φa−φ0a)/φAL = −4.371
H = 0.9 Hmax . . . (φa−φ0a)/φAL = −7.058
H = 1.0 Hmax . . . (φa−φ0a)/φAL= −10.284
[Values of the Condition (1B) on the Fifth Surface (S5)]
H = 0.0 Hmax . . . (φa−φ0a)/φAL = 0.000
H = 0.1 Hmax . . . (φa−φ0a)/φAL = −0.011
H = 0.2 Hmax . . . (φa−φ0a)/φAL = −0.028
H = 0.3 Hmax . . . (φa−φ0a)/φAL = 0.003
H = 0.4 Hmax . . . (φa−φ0a)/φAL = 0.154
H = 0.5 Hmax . . . (φa−φ0a)/φAL = 0.514
H = 0.6 Hmax . . . (φa−φ0a)/φAL = 1.161
H = 0.7 Hmax . . . (φa−φ0a)/φAL = 2.152
H = 0.8 Hmax . . . (φa−φ0a)/φAL = 3.493
H = 0.9 Hmax . . . (φa−φ0a)/φAL = 5.113
H = 1.0 Hmax . . . (φa−φ0a)/φAL = 6.826
[Values of the Condition (1B) on the Sixteenth Surface (S16)]
H = 0.0 Hmax . . . (φa−φ0a)/φAL = 0.000
H = 0.1 Hmax . . . (φa−φ0a)/φAL= −0.024
H = 0.2 Hmax . . . (φa−φ0a)/φAL= −0.096
H = 0.3 Hmax . . . (φa−φ0a)/φAL = −0.213
H = 0.4 Hmax . . . (φa−φ0a)/φAL = −0.372
H = 0.5 Hmax . . . (φa−φ0a)/φAL = −0.572
H = 0.6 Hmax . . . (φa−φ0a)/φAL = −0.808
H = 0.7 Hmax . . . (φa−φ0a)/φAL = −1.069
H = 0.8 Hmax . . . (φa−φ0a)/φAL = −1.320
H = 0.9 Hmax . . . (φa−φ0a)/φAL = −1.489
H = 1.0 Hmax . . . (φa−φ0a)/φAL= −1.441

TABLE 6

Values of the Conditions

| Condition | Ex. 1 | Ex. 2 | Ex. 3 | Ex. 4 | Ex. 5 |
|---|---|---|---|---|---|
| (2) (Σvoρ −Σvom)/Lo | 3.000 | 0.194 | 0.194 | 3.483 | 11.977 |
| (3) (Σviρ −Σvim)/Li | 19.764 | 20.272 | 20.272 | 19.012 | 23.050 |
| (4) \|φf1/φf\| | 0.098 | 1.249 | 1.233 | 1.659 | 0.597 |
| (5) ν2m | G9 23.82 | G7 22.60 | G7 22.60 | G6 31.72 | G5 31.72 |
|  | G12 25.14 | G10 23.82 | G10 23.82 | G9 21.00 | G8 21.00 |

What is claimed is:

1. A scanning optical system that comprises, from an object side, an object-side lens unit, a mirror, and an image-side lens unit and that scans an object by rotating the mirror while forming an image of the object on a one-dimensional line sensor, wherein the object-side lens unit includes at least one aspherical surface that fulfills the condition (1B) below in a range that fulfills the condition (1A) below:

$$0 < H < Hmax \quad (1A)$$

$$-20.0 < (\phi a - \phi 0a)/\phi AL < 20.0 \quad (1B)$$

where
H represents a height in a direction of a radius of a lens element that has the aspherical surface,
Hmax represents an effective radius of the lens element that has the aspherical surface,
$\phi a$ represents a local power of the aspherical surface,
$\phi 0a$ represents a power of the aspherical surface due to a reference curvature thereof, and
$\phi AL$ represents a power of the lens element that has the aspherical surface, where $\phi a$ and $\phi 0a$ are defined by the formulae (1C) and (1D) below:

$$\phi a = Calo(N'-N) \quad (1C)$$

$$\phi 0a = C0(N-N) \quad (1D)$$

where
Calo represents a local curvature of the aspherical surface at a height H,
C0 represents the reference curvature of the aspherical surface,
N' represents a refractive index of a medium existing on an image side of the aspherical surface, and
N represents a refractive index of a medium existing on an object side of the aspherical surface.

2. A scanning optical system as claimed in claim 1, wherein the object-side lens unit fulfills the condition (2) below:

$$-10.0 < (\Sigma vop - \Sigma vom)/Lo < 20.0 \quad (2)$$

where
$\Sigma vop$ represents a sum of Abbe numbers of positive lens elements included in the object-side lens unit,
$\Sigma vom$ represents a sum of Abbe numbers of negative lens elements included in the object-side lens unit, and
Lo represents number of lens elements included in the object-side lens unit.

3. A scanning optical system as claimed in claim 1, wherein the object-side lens unit has the aspherical surface disposed at an object-side end thereof.

4. A scanning optical system as claimed in claim 1, wherein the object-side lens unit has a cemented lens element, composed of a positive lens element and a negative lens element cemented together, disposed at an object-side end thereof.

5. A scanning optical system that comprises, from an object side, an object-side lens unit, a mirror, and an image-side lens unit and that scans an object by rotating the mirror while forming an image of the object on a one-dimensional line sensor, wherein the image-side lens unit includes at least one aspherical surface that fulfills the condition (1B) below in a range that fulfills the condition (1A) below:

$$0 < H < Hmax \quad (1A)$$

$$-20.0 < (\phi a - \phi 0a)/\phi AL < 20.0 \quad (1B)$$

where
H represents a height in a direction of a radius of a lens element that has the aspherical surface,
Hmax represents an effective radius of the lens element that has the aspherical surface,
$\phi a$ represents a local power of the aspherical surface,
$\phi 0a$ represents a power of the aspherical surface due to a reference curvature thereof, and
$\phi AL$ represents a power of the lens element that has the aspherical surface, where $\phi a$ and $\phi 0a$ are defined by the formulae (1C) and (1D) below:

$$\phi a = Calo(N'-N) \quad (1C)$$

$$\phi 0a = C0(N'-N) \quad (1D)$$

where
Calo represents a local curvature of the aspherical surface at a height H,
C0 represents the reference curvature of the aspherical surface,
N' represents a refractive index of a medium existing on an image side of the aspherical surface, and
N represents a refractive index of a medium existing on an object side of the aspherical surface.

6. A scanning optical system as claimed in claim 5, wherein the image-side lens unit fulfills the condition (3) below:

$$10.0 < (\Sigma vip - \Sigma vim)/Li < 50.0 \quad (3)$$

where
$\Sigma vip$ represents a sum of Abbe numbers of positive lens elements included in the image-side lens unit,
$\Sigma vim$ represents a sum of Abbe numbers of negative lens elements included in the image-side lens unit, and
Li represents number of lens elements included in the image-side lens unit.

7. A scanning optical system as claimed in claim 5, wherein the image-side lens unit has the aspherical surface disposed at an image-side end thereof.

* * * * *

UNITED STATES PATENT AND TRADEMARK OFFICE
CERTIFICATE OF CORRECTION

PATENT NO. : 6,304,361 B1
DATED : October 16, 2001
INVENTOR(S) : Junji Hashimura Page 1 of 1

It is certified that error appears in the above-identified patent and that said Letters Patent is hereby corrected as shown below:

Column 8,
Line 50, delete "EXAMPLE", and insert -- EXAMPLES --.

Column 9,
Line 7, delete "(Si))" and insert -- (S1)) --.
Line 10, delete "450°", and insert -- 45° --.

Column 10,
Line 3, delete "450°", and insert -- 45° --.

Column 11,
Line 13 (line 10 of the continuation of Table 1), delete "$10^{-4}$", and insert -- $10^{-7}$ --.

Column 15,
Line 21 (line 20 of the continuation of Table 3), delete "10-6", and insert -- $10^{-6}$ --.

Column 23,
Line 30, delete "φ0a=CO(N-N)", and insert -- φ0a=CO(N'-N) --.

Signed and Sealed this

Second Day of April, 2002

Attest:

*Attesting Officer*

JAMES E. ROGAN
*Director of the United States Patent and Trademark Office*